US012674689B2

(12) United States Patent
Carruthers-Watt et al.

(10) Patent No.: US 12,674,689 B2
(45) Date of Patent: Jul. 7, 2026

(54) ROTARY ENCODER

(71) Applicant: RENISHAW PLC, Wotton-under-Edge (GB)

(72) Inventors: Benjamin Nigel Carruthers-Watt, Wotton-under-Edge (GB); Finlay Jonathan Evans, Wotton-under-Edge (GB); Matthew Damian Harrison, Wotton-under-Edge (GB)

(73) Assignee: RENISHAW PLC, Wotton-under-Edge (GB)

( * ) Notice: Subject to any disclaimer, the term of this patent is extended or adjusted under 35 U.S.C. 154(b) by 385 days.

(21) Appl. No.: 18/273,058

(22) PCT Filed: Feb. 8, 2022

(86) PCT No.: PCT/GB2022/050328
§ 371 (c)(1),
(2) Date: Jul. 19, 2023

(87) PCT Pub. No.: WO2022/171994
PCT Pub. Date: Aug. 18, 2022

(65) Prior Publication Data
US 2024/0085219 A1 Mar. 14, 2024

(30) Foreign Application Priority Data

Feb. 9, 2021 (EP) ..................................... 21275014
Oct. 4, 2021 (WO) ................ PCT/GB2021/052562

(51) Int. Cl.
*G01D 5/347* (2006.01)
*G01D 5/244* (2006.01)

(52) U.S. Cl.
CPC ..... *G01D 5/24442* (2013.01); *G01D 5/34715* (2013.01); *G01D 5/3473* (2013.01); *G01D 5/34738* (2013.01)

(58) Field of Classification Search
CPC ............. G01D 5/3473; G01D 5/24442; G01D 5/34715; G01B 5/003; G01B 5/14; (Continued)

(56) References Cited

U.S. PATENT DOCUMENTS

| | | | |
|---|---|---|---|
| 1,183,190 A | 5/1916 | Hansell | |
| 2,855,228 A | 10/1958 | Peter et al. | |
| | (Continued) | | |

FOREIGN PATENT DOCUMENTS

| | | |
|---|---|---|
| AU | 2012 100 637 A4 | 8/2012 |
| CN | 102744731 A | 10/2012 |
| | (Continued) | |

OTHER PUBLICATIONS

Sep. 12, 2022 Search Report issued in European Patent Application No. 22275041.6.

(Continued)

*Primary Examiner* — Peter J Macchiarolo
*Assistant Examiner* — Anna Josephine Saunders
(74) *Attorney, Agent, or Firm* — Oliff PLC

(57) ABSTRACT

A method of mounting rotary scale member on machine part includes: locating rotary scale member on machine part such that scale axis and axis of rotation are substantially parallel, and subsequently arranging at least a first radial adjustment device to contact both machine part and rotary scale member, and manipulating the at least first radial adjustment device to radially displace body of rotary scale member. At least the majority of any radial reaction force, generated as a result of the interaction of at least one of the flexures with a radial stop member against which it is radially pressed, and which is imparted on the at least first radial adjustment device by rotary scale member in opposition to the radial displacement of the rotary scale member, is directed into, (Continued)

and reacted by, the machine part via the contact between the at least first radial adjustment device and the machine part.

17 Claims, 13 Drawing Sheets

(58) Field of Classification Search
CPC ...... G01B 3/28; B22F 10/28; B22F 2005/002; B33Y 80/00; B33Y 10/00; F01L 2301/00; F01L 2303/00; F01L 2303/01; B23P 15/00
USPC .......................................................... 33/501
See application file for complete search history.

(56) References Cited

U.S. PATENT DOCUMENTS

| | | | |
|---|---|---|---|
| 3,463,520 A | 8/1969 | Turro | |
| 3,708,243 A | 1/1973 | Wooden | |
| 3,740,085 A | 6/1973 | Evans | |
| 3,761,114 A | 9/1973 | Blakeley | |
| 3,774,675 A | 11/1973 | Yoshiro | |
| 3,871,668 A | 3/1975 | Coker et al. | |
| 4,183,688 A * | 1/1980 | Persson | F16D 1/0805 |
| | | | 464/33 |
| 4,472,713 A | 9/1984 | Breslow | |
| 4,476,457 A | 10/1984 | Kondo | |
| 4,556,792 A | 12/1985 | Kano et al. | |
| 4,620,814 A | 11/1986 | May | |
| 4,718,879 A | 1/1988 | Wada | |
| 4,795,902 A | 1/1989 | Kitaue | |
| 4,835,505 A | 5/1989 | Hattori et al. | |
| 4,862,044 A | 8/1989 | Karashima et al. | |
| 4,926,566 A | 5/1990 | McMurtry et al. | |
| 4,940,936 A | 7/1990 | Grillo et al. | |
| 4,942,295 A | 7/1990 | Brunner et al. | |
| 4,959,542 A | 9/1990 | Stephens | |
| 4,974,962 A | 12/1990 | Stephens et al. | |
| 5,174,680 A | 12/1992 | Nakamura et al. | |
| 5,176,085 A | 1/1993 | Hara et al. | |
| 5,196,970 A | 3/1993 | Seko et al. | |
| 5,218,199 A | 6/1993 | Miller | |
| 5,227,930 A | 7/1993 | Thanos et al. | |
| 5,698,849 A | 12/1997 | Figueria, Jr. | |
| 5,758,427 A | 6/1998 | Feichtinger et al. | |
| 6,087,748 A | 7/2000 | Donner | |
| 6,094,047 A | 7/2000 | Guzik et al. | |
| 6,098,295 A | 8/2000 | Feichtinger | |
| 6,255,644 B1 * | 7/2001 | Taniguchi | G01D 5/34738 |
| | | | 250/237 G |
| 6,293,021 B1 | 9/2001 | Freitag et al. | |
| 6,359,432 B1 | 3/2002 | Okumura | |
| 6,360,449 B1 | 3/2002 | Steentjes | |
| 6,396,016 B1 | 5/2002 | Lin et al. | |
| 6,481,115 B1 | 11/2002 | Henshaw et al. | |
| 6,508,140 B2 | 1/2003 | Zaps | |
| 6,536,267 B2 | 3/2003 | Kieselbach | |
| 6,608,300 B2 | 8/2003 | Meschko | |
| 6,642,508 B2 | 11/2003 | Setbacken et al. | |
| 6,810,590 B2 | 11/2004 | Sano | |
| 6,885,188 B2 | 4/2005 | Russell | |
| 6,960,758 B2 | 11/2005 | Tenca et al. | |
| 6,966,118 B2 | 11/2005 | Sano | |
| 7,034,282 B2 | 4/2006 | Oka et al. | |
| 7,281,851 B2 | 10/2007 | Horiuchi et al. | |
| 7,367,128 B2 | 5/2008 | McMurtry et al. | |
| 7,499,827 B2 | 3/2009 | Gordon-Ingram | |
| 7,601,948 B1 | 10/2009 | Setbacken et al. | |
| 7,659,992 B2 | 2/2010 | McMurtry et al. | |
| 7,669,346 B2 | 3/2010 | Madore | |
| 7,795,771 B2 | 9/2010 | Lott et al. | |
| 7,958,620 B2 | 6/2011 | Henshaw | |
| 8,077,426 B2 | 12/2011 | Guzik et al. | |
| 8,525,459 B2 | 9/2013 | Setbacken et al. | |
| 8,829,421 B2 | 9/2014 | Noguchi et al. | |
| 9,091,569 B2 | 7/2015 | Gottemoller et al. | |
| 9,103,381 B2 | 8/2015 | Arnstein | |
| 9,658,049 B2 | 5/2017 | Arnstein et al. | |
| 10,094,684 B2 | 10/2018 | Horiguchi et al. | |
| 10,132,657 B2 | 11/2018 | Gordon-Ingram et al. | |
| 10,240,952 B2 | 3/2019 | Fukuda et al. | |
| 10,989,569 B2 | 4/2021 | Thaler et al. | |
| 11,692,856 B1 | 7/2023 | Siracki | |
| 11,879,756 B2 | 1/2024 | Lai et al. | |
| 2001/0006314 A1 | 7/2001 | Braun | |
| 2002/0089300 A1 | 7/2002 | Uchiyama et al. | |
| 2003/0042408 A1 | 3/2003 | Setbacken et al. | |
| 2003/0094568 A1 | 5/2003 | Meschko | |
| 2004/0118758 A1 | 6/2004 | Gordon-Ingram | |
| 2004/0206894 A1 | 10/2004 | Oka et al. | |
| 2005/0047691 A1 | 3/2005 | Niebling et al. | |
| 2005/0069233 A1 | 3/2005 | Horiuchi et al. | |
| 2005/0087683 A1 | 4/2005 | Kawai et al. | |
| 2005/0229410 A1 * | 10/2005 | McMurtry | G01D 5/34738 |
| | | | 33/1 PT |
| 2006/0065414 A1 | 3/2006 | Brandl et al. | |
| 2007/0069594 A1 | 3/2007 | Braun | |
| 2008/0013105 A1 | 1/2008 | McMurtry et al. | |
| 2008/0189934 A1 | 8/2008 | Henshaw | |
| 2008/0240849 A1 | 10/2008 | Lindemann | |
| 2009/0095892 A1 | 4/2009 | Summers et al. | |
| 2009/0252549 A1 | 10/2009 | Takeuchi et al. | |
| 2009/0323203 A1 | 12/2009 | Adams et al. | |
| 2010/0038527 A1 | 2/2010 | Madore | |
| 2011/0271540 A1 | 11/2011 | Henshaw | |
| 2012/0076575 A1 | 3/2012 | Smith | |
| 2012/0206024 A1 | 8/2012 | Yoshida et al. | |
| 2013/0269198 A1 | 10/2013 | Sivec et al. | |
| 2013/0296062 A1 * | 11/2013 | Arnstein | G01P 1/026 |
| | | | 464/62.1 |
| 2016/0216137 A1 | 7/2016 | Horiguchi et al. | |
| 2018/0259369 A1 | 9/2018 | Fukuda et al. | |
| 2019/0017848 A1 | 1/2019 | Horiguchi et al. | |
| 2019/0250012 A1 * | 8/2019 | Thaler | G01D 5/3473 |
| 2021/0182673 A1 | 6/2021 | Brugger et al. | |
| 2023/0003557 A1 | 1/2023 | Evans et al. | |
| 2023/0053557 A1 | 2/2023 | Lee et al. | |
| 2023/0126475 A1 | 4/2023 | Nakazawa et al. | |
| 2024/0085219 A1 * | 3/2024 | Carruthers-Watt | .......................... G01D 5/3473 |
| 2024/0085220 A1 * | 3/2024 | Henshaw | G01D 5/34738 |
| 2024/0295417 A1 | 9/2024 | Evans et al. | |

FOREIGN PATENT DOCUMENTS

| | | |
|---|---|---|
| CN | 205212642 U | 5/2016 |
| CN | 108375385 A | 8/2018 |
| CN | 209524932 U | 10/2019 |
| CN | 218035079 U | 12/2022 |
| DE | 2429741 A1 | 1/1976 |
| DE | 2518774 A1 | 11/1976 |
| DE | 3419101 C1 | 7/1985 |
| DE | 3740744 A1 | 6/1988 |
| DE | 4130111 A1 | 3/1993 |
| DE | 19601271 A1 | 7/1997 |
| DE | 296 22 996 U1 | 10/1997 |
| DE | 197 42 114 A1 | 3/1999 |
| DE | 19751019 A1 | 6/1999 |
| DE | 100 19 499 A1 | 10/2001 |
| DE | 102008046540 A1 | 3/2010 |
| DE | 102010030121 A1 | 2/2011 |
| DE | 102011015886 A1 | 10/2012 |
| EP | 0204345 A2 | 12/1986 |
| EP | 0 207 121 A1 | 1/1987 |
| EP | 0213732 A1 | 3/1987 |
| EP | 0293487 A1 | 12/1988 |
| EP | 0 207 121 B1 | 1/1990 |
| EP | 0520853 A1 | 12/1992 |
| EP | 0927873 A1 | 7/1999 |
| EP | 1094302 A2 | 4/2001 |
| EP | 1526363 A1 | 4/2005 |
| EP | 2028449 A1 | 2/2009 |
| EP | 2 065 684 A2 | 6/2009 |
| EP | 2 660 610 A2 | 11/2013 |

(56) References Cited

FOREIGN PATENT DOCUMENTS

| EP | 2660567 A1 | 11/2013 |
|----|------------|---------|
| EP | 3048427 A1 | 7/2016 |
| FR | 3060897 A1 | 6/2018 |
| GB | 1511801 A | 5/1978 |
| GB | 2358063 A | 7/2001 |
| GB | 2388431 A | 11/2003 |
| JP | S59-142420 A | 8/1984 |
| JP | S60-16017 U | 2/1985 |
| JP | S63-176869 A | 7/1988 |
| JP | S64-3330 A | 1/1989 |
| JP | H02-16412 A | 1/1990 |
| JP | H04-82271 A | 3/1992 |
| JP | H05-272990 A | 10/1993 |
| JP | H05-296789 A | 11/1993 |
| JP | H06-40812 U | 5/1994 |
| JP | H06-347290 A | 12/1994 |
| JP | H09-115261 A | 5/1997 |
| JP | H11-2256 A | 1/1999 |
| JP | H11-14404 A | 1/1999 |
| JP | H11-83542 A | 3/1999 |
| JP | 2004-340929 A | 12/2004 |
| JP | 2008-064543 A | 3/2008 |
| JP | 2016-138759 A | 8/2016 |
| JP | 2017-177245 A | 10/2017 |
| JP | 2018-151178 A | 9/2018 |
| RU | 2212099 C1 | 9/2003 |
| TW | 200600753 A | 1/2006 |
| TW | I269021 B | 12/2006 |
| WO | 2004/008076 A1 | 1/2004 |
| WO | 2006/114602 A1 | 11/2006 |
| WO | 2010/072498 A1 | 7/2010 |
| WO | 2021/116660 A1 | 6/2021 |
| WO | 2022/074368 A1 | 4/2022 |
| WO | 2022/074371 A1 | 4/2022 |
| WO | 2022/171994 A1 | 8/2022 |
| WO | 2022/171995 A1 | 8/2022 |

OTHER PUBLICATIONS

Jun. 28, 2023 Search Report issued in International Patent Application No. PCT/GB2023/050829.
Jun. 28, 2023 Written Opinion of the International Searching Authority issued in International Patent Application No. PCT/GB2023/050829.
U.S. Appl. No. 18/848,166, filed Sep. 18, 2024 in the name of Carruthers-Watt et al.
May 8, 2025 Office Action issued in U.S. Appl. No. 18/027,407.
Feb. 16, 2024 U.S. Office Action issued in U.S. Appl. No. 18/272,847.
May 11, 2022 International Search Report issued in International Patent Application No. PCT/GB2022/050329.
May 11, 2022 Written Opinion issued in International Patent Application No. PCT/GB2022/050329.
Wikipedia Page, "Indicator (distance amplifying instrument)", Accessed Dec. 21, 2023.
Mar. 19, 2021 Search Report Issued in British Patent Application No. 2015773.1.
Dec. 13, 2021 Search Report Issued in International Patent Application No. PCT/GB2021/052557.
Dec. 13, 2021 Written Opinion of the International Searching Authority Issued in International Patent Application No. PCT/GB2021/052557.
Jul. 12, 2021 Search Report Issued in European Patent Application No. EP 21 27 5014.5.
Dec. 23, 2021 Search Report Issued in International Patent Application No. PCT/GB2021/052562.
Dec. 23, 2021 Written Opinion of the International Searching Authority Issued in International Patent Application No. PCT/GB2021/052562.
Feb. 12, 2021 Search Report issued in International Patent Application No. PCT/GB2020/053084.
May 29, 2020 Search Report issued in British Patent Application No. GB1918002.5.
"E4P Assembly Instructions"; US Digital; www.usdigital.com; pp. 1-2.
Feb. 12, 2021 Written Opinion of the International Searching Authority issued in International Patent Application No. PCT/GB2020/053084.
U.S. Appl. No. 18/272,847, filed Jul. 18, 2023 in the name of Henshaw et al.
U.S. Appl. No. 18/027,195, filed Mar. 20, 2023 in the name of Evans et al.
U.S. Appl. No. 18/027,407, filed Mar. 21, 2023 in the name of Henshaw et al.
May 9, 2022 International Search Report issued in International Patent Application No. PCT/GB2022/050328.
May 9, 2022 Written Opinion issued in International Patent Application No. PCT/GB2022/050328.
Jun. 5, 2025 Notice of Allowance issued in U.S. Appl. No. 18/027,195.
Apr. 20, 2026 Notice of Allowance issued in U.S. Appl. No. 18/027,195.

* cited by examiner

ROTARY ENCODER

This invention relates to a method of mounting a part of a rotary encoder, such as a rotary scale member, on to a rotatable part of a machine.

Metrological scales are used in the position measurement of parts of a machine which can move relative to each other. A metrological scale typically has a series of features on it which can be read by a readhead so that the readhead can provide a measure of its position along, or around, the scale. The metrological scale can be mounted onto one part of a machine and is read by a suitable readhead which is attached to the other part of the machine. Types of metrological scale include magnetic scales (in which the scale features are provided by features having particular magnetic properties), capacitive scales (in which the scale features are provided by features having particular capacitive properties), inductive scales (in which the scale features are provided by features having particular inductive properties) and optical scales (in which the scale features are provided by features having particular optical properties). Optical scales can be transmissive or reflective. An example of an optical scale configuration is disclosed in EP-A-0 207 121 and also U.S. Pat. No. 4,974,962.

For measuring rotary displacement, such a scale may be provided on a member which rotates in use with the shaft or other rotary part relative to the readhead. In particular, the member which has the scale features and which rotates in use with the shaft can be an annular body, in the form of a disc or a ring.

It can be desirable to be able to adjust the radial location of the rotary scale member during the process of mounting the rotary scale member to the machine part. Whilst techniques are already known for adjusting the radial location of the rotary scale member, such as those described in U.S. Pat. No. 9,103,381, the present invention provides effective alternative techniques.

Accordingly, the present invention relates to an improved/alternative method of mounting a rotary encoder. In particular, the invention relates to a rotary scale member, comprising a body (e.g. an annular body) on which a series of position features defining a scale is provided, and one or more flexures (in other words "springs").

According to a first aspect of the invention there is provided a method of mounting a rotary scale member on a machine part which is configured to rotate about an axis of rotation, the rotary scale member comprising a body on which a series of scale features defining a scale that extends around a scale axis is or can be provided, and at least three, radially-compliant flexures, spaced around said scale axis. The method can comprise: i) locating the rotary scale member on the machine part such that the scale axis and axis of rotation are substantially parallel. The method can further comprise ii) subsequently arranging at least a first radial adjustment device so as to contact both the machine part and the rotary scale member. Step ii) can further comprise manipulating the at least first radial adjustment device so as to radially displace the body of the rotary scale member. At least the majority of any radial reaction force, generated by/as a result of the interaction of at least one of said flexures with a radial stop member against which it is radially pressed, and which is imparted on the at least first radial adjustment device by the rotary scale member in opposition to said radial displacement of the rotary scale member, could be directed into, and reacted by, the machine part via the contact between the at least first radial adjustment device and the machine part.

The present invention has been found to provide effective methods for adjusting the radial position of the body of the rotary scale member. For example, methods in accordance with the present invention can provide predictable, controlled, radial adjustment of the body of the rotary scale member. The provision of a radial stop member against which a flexure (spring) is radially pressed so as to generate a radial reaction force in opposition to said radial displacement can be beneficial in order to aid undoing of any radial displacement effected by the manipulation of the radial adjustment device.

As will be understood, the flexures are resiliently compliant in the radial direction (with respect to the rotary scale member). Accordingly, the flexures could be referred to as "springs" or "radial spring members".

In an optional embodiment of the invention, the at least three flexures can be in a non-flexed state at step i). Accordingly, when the rotary scale member is initially located on the machine part, its at least three flexures can be in a non-flexed (i.e. relaxed) state. This is contrast to, and can be advantageous over, embodiments in which step i) comprises force-fitting the rotary scale member onto a feature of the machine part whereby the at least one of said flexures is radially displaced away from its relaxed state and thereby urges the rotary scale member via a radial reaction force into engagement with the machine part so as to form a friction fit with the part such that the body of the rotary scale member self-locates at an initial default radial location with respect to the part. Accordingly, step ii) can comprise causing at least one of the flexures to become radially pressed against said stop member and thereby become deformed/displaced away from its non-flexed/relaxed state.

As will be understood, the radial displacement of the body at step ii) can cause a change in the extent to which said at least one of the flexures is radially pressed against a radial stop member (e.g. can cause a change in the extent to which said at least one of the flexures is deformed/displaced away from its non-flexed/relaxed state).

Said stop member could comprise an integral part of the machine part. For instance, the stop member could comprise an integral hub or shaft, e.g. which could be protruding from a surface/feature on which the rotary scale member is initially located at step i) (e.g. extending from a surface/feature which controls the axial position of the rotary scale member). In an optional, but advantageous embodiment of the invention, the stop member is not an integral part of the machine part. This can be preferred/advantageous as it avoids the need for the machine part to provide a feature against which the flexures are radially pressed. For example, the present invention can be used on machine parts which do not have a suitable protruding feature (e.g. hub or shaft) extending from a surface/feature on which the rotary scale member is initially located (e.g. extending from a surface/feature which controls the axial position of the rotary scale member). Accordingly, preferably, the method additionally comprises providing (e.g. arranging on/anchoring to the machine part), adjacent at least one of said flexures, said radial stop member. Accordingly, the stop member can be a separate piece to the machine part, e.g. such that it is detachably fastened to the machine part.

The radial stop member could comprise/be a radial adjustment device. Accordingly, one and the same device could perform the functions of a radial stop member and a radial adjustment device. As will be understood, which function it is performing at any given moment in time will depend on how it is being used. For example, if the device itself is being manipulated (e.g. by an installer/operator) so as to effect the radial adjustment of the body of the rotary scale member, then it is performing the function of a radial adjustment device. However, at another moment in time, it could be that other means (e.g. another radial adjustment device) is used to effect the radial adjustment of the body of the rotary scale member is, and so the device at that moment in time is merely acting as a stop member. However, this need not necessarily be the case; the stop member could be configured such that it can only function as a stop member and cannot be used to effect the radial displacement the body of the rotary scale member.

It can be desirable to avoid significant deformation of at least the part of the body/substrate on which the series of position features is provided because such deformations can adversely affect the metrological performance of the rotary scale member. Accordingly, preferably the shape and size of at least the part of the body/substrate on which the scale is provided is substantially unaltered by said manipulation of the radial adjustment device and said radial displacement of the rotary scale member. Rather, preferably such manipulation/displacement primarily causes a change in the state of flex of one or more of the at least three flexures. For instance, said manipulation/displacement can change the extent of displacement or deformation of at least one of the at least three flexures from its/their rest position/configuration, and thereby substantially isolate the scale from any deformation caused by the manipulation/displacement.

As will be understood, step i) can comprise locating the rotary scale member on a reference plane of the machine part, such that the scale axis and axis of rotation are substantially parallel. As will be understood, the axial position of the rotary scale member (i.e. the location of the rotary scale member along the axis of rotation) can be controlled/defined by the machine part at step i); in other words the rotary scale member can be supported/held at a predetermined axial position by the machine part at step i). The reference plane can extend perpendicularly to the axis of rotation. The reference plane could be defined by a substantially flat, planar surface. Optionally, the reference plane is defined by a plurality of discrete seats (e.g. protrusions, such as, for example, hemi-spherical members) configured to receive the rotary scale member. Such discrete seats could be annularly spaced around the axis of rotation, e.g. equiangularly spaced around the axis of rotation.

The body of the rotary scale member could comprise an annular body. The body, e.g. the annular body, can comprise a planar disc. The series of position features can be provided on a planar face of the rotary scale member (e.g. planar disc) (as opposed to on the peripheral edge, which is more commonly associated with a ring scale/encoder). Accordingly, the rotary scale member can comprise a disc scale member (which can also, interchangeably, be referred to as a scale disc member) (e.g. for a disc encoder) comprising a planar surface on which the series of scale features defining a scale is or can be provided, the scale axis extending normal to the planar surface. Optionally, the planar disc is not more than 5 mm thick, for instance not more than 3 mm thick, for example about 1 mm thick. Preferably, the at least three flexures are provided substantially in plane with the planar disc. This provides for a particularly compact rotary/disc scale member.

The at least three flexures could be provided on a member (e.g. a hub) which is formed separately from, but attached to, the body of the rotary scale member. For example, the scale features could be formed/provided on a glass disc substrate which is attached (e.g. bonded) to a member (e.g. a hub) which comprise said at least three flexures. However, preferably the at least three flexures are integrally formed on the body of the rotary scale member. For instance, the body on which the scale track is or can be provided, and the at least three flexures can be formed from a single piece of material. Again, this helps to provide for a particularly compact rotary scale member, as well as helps to ensure that the radial reaction forces are contained in the plane of the body. For example, the body of the rotary scale member and the at least three flexures could be formed (e.g. cut) from a single sheet or plate of material (e.g. metallic material).

Preferably, the body comprises a metallic material, but as will be understood, other materials could be used.

The at least first radial adjustment device could be arranged so as to contact one of said flexures of the rotary scale member (e.g. as described in more detail below, a foot of one of said flexures). Accordingly, manipulating the at least first radial adjustment device could cause a radial displacement of the flexure (e.g. its foot), and thereby cause a radial displacement of the body of the rotary scale member. Arranging the radial adjustment device to contact and act against a flexure (e.g. as opposed to directly contact the body of the rotary scale member) can help to avoid deformations of the body of the rotary scale member. The radial reaction force could be generated by/as a result of the interaction of at least one other of said flexures (e.g. the foot of at least one other of said flexures) with a radial stop member against which it is radially pressed.

In a preferred embodiment, at least the flexure in contact with the radial adjustment device being adjusted (for example, at least the foot of the flexure) is not radially compressed between the radial adjustment device and any other part/member (e.g. during step ii)), e.g. any other part of the machine part.

Accordingly, the radial flexure is free to move/be displaced by the radial adjustment device.

At least one of (and optionally all of) the at least three flexures can comprise a foot portion. Said radial adjustment device(s) and/or stop member(s) can be arranged/configured to contact the foot portion of a flexure. The foot portion could be attached to the body of the rotary scale member by one or more legs/leg portions. The foot and/or leg(s)/leg portion(s) could be configured to be resiliently flexible/deflectable/deformable. Accordingly, the radial displacement of the body of the rotary scale member could cause the foot and/or leg(s)/leg portion(s) to flex/deflect/deform from its/their relaxed/non-flexed state. The radial reaction force could be generated by the flexing/deflecting/deformation of the foot and/or leg(s)/leg portion(s).

Optionally, at least one of (and optionally all of) the at least three flexures is (are) configured to be compliant both radially and tangentially. For example, at least one of (and optionally all of) the at least three flexures can comprise a foot portion against which a radial adjustment device or stop member is configured to act against/engage, and wherein the flexure is configured such that the foot portion is both radially and tangentially compliant relative to the body (of the rotary scale member). For instance, the foot portion could be attached to the body by one or more legs/leg portions. For example, the foot portion could itself be radially compliant and the one or more legs could provide the tangential compliance. The radial and/or tangential compliance could be provided by bending of the relevant part (e.g. by the bending of the foot along its length, or by the bending of the leg(s) along its(their) length). For instance, the rotary scale member could comprise four radially and tangentially compliant, flexures (e.g. which are equiangularly spaced around the scale axis).

Optionally, all of the at least three flexures are located radially outward of the series of position features defining the scale (for example, a flexure(s) could be located on or toward the outer periphery of the body (of the rotary scale member). Optionally all of the at least three flexures are located radially inward of the series of position features defining the scale. However, this need not necessarily be the case and at least one of the at least three flexures could be located radially outward of the series of position features defining the scale, and at least one of the at least three flexures could be located radially inward of the series of position features defining the scale.

The body of the rotary scale member can comprise a hole. The hole can be substantially centrally located within the body. At least one of (and optionally all of) the at least three flexures can be provided around the edge/perimeter/boundary/circumference of the hole. Accordingly, at least one of (and optionally all of) the at least three flexures can face radially inward, toward the centre of the hole. The at least three flexures can define the hole.

Optionally, at least one of (and optionally each of) said flexures defines a flexure void between the body of the rotary scale member and the part (e.g. foot) of the flexure. Said part of the flexure (e.g. said foot part) can be that part which is configured to contact a radial stop member/radial adjustment device. For example, said part of the flexure (e.g. said foot part) can be that part which is configured to be radially pressed against a radial stop member/radial adjustment device. In such a case, at least a part of the radial stop member radial adjustment device which is in contact with the flexure can reside within said flexure void (as opposed to being located outside of the void). Accordingly, said part of the radial stop member/radial adjustment device should be smaller than the void at least in the radial direction so as to not press against the body of the rotary scale member.

The radial adjustment device can comprise a rotatable member. The rotatable member can be rotatable about a radial adjustment device axis. The method of the invention/the radial adjustment device can be configured/arranged such that rotation of said rotatable member causes a change in the radial displacement of the body of the rotary scale member. The method of the invention/the radial adjustment device can be configured/arranged such that rotation of said rotatable member causes a change in the radial displacement of at least a part of the flexure (e.g. its foot) against which the radial adjustment device contacts/acts/engages and thereby causes a radial displacement of the body of the rotary scale member. The method of the invention/the radial adjustment device can be configured/arranged such that rotation of said rotatable member causes a change in the radial position of the point of contact between the radial adjustment device and the rotary scale member. At step ii), the radial adjustment device axis could be arranged substantially parallel to the axis of rotation/the scale axis. The radial adjustment device could be referred to as a rotatable radial adjustment device.

The radial adjustment device (e.g. the rotatable radial adjustment device) can comprise a threaded member/part. For example, the radial adjustment device could comprise a bolt or screw. As described in more detail below, the radial adjustment device can comprise an anchor portion, and in that case the anchor portion can comprise the threaded member/part. The anchor portion/the threaded member/part could be configured to engage a corresponding threaded member (e.g. a threaded hole) on the machine part. Rotating the rotatable member of the radial adjustment device about the radial adjustment device axis could cause the radial adjustment device to move along the axis. For example, rotating the radial adjustment device about the radial adjustment device axis can cause the radial adjustment device to move along the axis, further into (or out of, depending on the direction of rotation) a threaded hole in the part on which the rotary scale member is mounted. In the case in which the machine part is a shaft, the threaded hole could be provided on a radially extending face or protrusion (e.g. a ledge or flange) which could be attached to the shaft, for example and end-face provided at the end of the shaft.

The radial adjustment device can comprise a tapered member (e.g. which tapers along the radial adjustment device axis, for example in step ii) along the axis of rotation/the scale axis). The method of the invention/the radial adjustment device can be configured/arranged such that rotation of the rotatable member about said radial adjustment device axis changes the axial position of the tapered member along the radial adjustment device axis, which in turn controls the extent of radial displacement of the body of the rotary scale member. For example, in those embodiments in which the radial adjustment device in contact with a flexure, the method of the invention/the radial adjustment device can be configured/arranged such that rotation of the rotatable member about said radial adjustment device axis changes the axial position of the tapered member along the radial adjustment device axis, which in turn controls the extent of radial displacement of the flexure it is in contact with. Such a configuration has been found to be advantageous for providing a very fine degree of control over the radial adjustment. The tapered member can comprise a conical shape (which could be a straight or curved conical shape).

The rotatable member of the radial adjustment device can comprise the threaded member which is received by a threaded hole in the machine part, such that rotation of the threaded member changes the axial position of the tapered member along the radial adjustment device axis. The threaded member could be an anchor portion (described in more detail below). In embodiments in which the radial adjustment device comprises a tapered member and a threaded member, the tapered member and the threaded member could comprise a single piece (e.g. made from a single piece of material). The radial adjustment device could comprise/be a radial adjustment bolt, wherein the head of the bolt comprises/is the tapered member.

The radial adjustment device can comprise an anchor portion. The radial adjustment device can be anchored to the machine part such that the radial adjustment device axis is radially fixed with respect to the machine part. The anchor portion could comprise a/said threaded member. Optionally, at least the majority of any (e.g. substantially all) radial reaction force imparted on the radial adjustment device (e.g. imparted on the rotary scale member manipulating portion, described in more detail below) is reacted by the machine part via the anchor portion so as to thereby hold the radial adjustment device at a radially fixed location.

The radial adjustment device could comprise a cam member. The cam member can have a non-constant radius and/or be eccentrically mounted, such that effective radius of the part of the cam member which is in contact with the rotary scale member (e.g. which in in contact with a flexure) can be controlled by rotation of the cam member.

The above-described tapered member, cam member and/or rotatable member could be configured to contact the rotary scale member. Optionally, the radial adjustment device comprises an intermediate member which is located between the tapered member/cam member/rotatable member and the rotary scale member. An intermediate member could, for example, comprise an O-ring, plug or sleeve. The intermediate member could be configured to deform, expand and/or move as the radial adjustment device (e.g. the tapered member/cam member/rotatable member) is manipulated.

The at least first radial adjustment device can comprise a rotary scale member manipulating portion (e.g. a flexure manipulating portion) and an anchor portion. Such a radial adjustment device can be arranged such that at step ii) the rotary scale member manipulating portion (e.g. the flexure manipulating portion) is configured to contact and act against the rotary scale member (e.g. against a flexure thereof), and the anchor portion is mounted to the machine part such that: manipulation of the radial adjustment device causes a change in the radial displacement of at least a part of the rotary scale member (e.g. at least a part of the flexure) against which the rotary scale member manipulation portion (e.g. flexure manipulation portion) acts and thereby causes a radial displacement of the body of the rotary scale member. At least the majority of any (e.g. substantially all) radial reaction force imparted on the rotary scale manipulating portion (e.g. on the flexure manipulation portion) could be reacted by the machine part via the anchor portion so as to thereby hold the radial adjustment device at a radially fixed location. As mentioned above, the anchor portion can be anchored to the machine part such that a radial adjustment device axis of the radial adjustment device is radially fixed with respect to the machine part.

Similarly, a radial stop member can comprise a rotary scale member engaging portion (e.g. a flexure engaging portion) and an anchor portion. Such a radial stop member can be arranged such that at step ii) the rotary scale member engaging portion (e.g. the flexure engaging portion) is configured to contact and act against the rotary scale member (e.g. against a flexure thereof), and the anchor portion is mounted to the machine part such that at least the majority of any (e.g. substantially all) radial force imparted on the rotary scale member engaging portion (e.g. the flexure engaging portion) is reacted by the machine part via the anchor portion so as to thereby hold the radial stop member at a radially fixed location.

With regards to the above-described radial adjustment device and/or radial stop member, the rotary scale member manipulation/engaging portion (e.g. the flexure manipulation/engaging portion) and the anchor portion thereof could comprise single piece (e.g. formed from/as a single piece). The rotary scale member manipulation portion (e.g. the flexure manipulation portion) and the anchor portion could be rotationally fixed relative to each other. For example, rotating the radial adjustment device could comprise rotating the rotary scale member manipulation portion (e.g. the flexure manipulation portion) and the anchor portion together. Optionally, the rotary scale member manipulation/engaging portion (e.g. the flexure manipulation/engaging portion) and the anchor portion could comprise separate pieces which are/can be connected. Optionally, the rotary scale member manipulation/engaging portion (e.g. the flexure manipulation/engaging portion) is rotatable relative to the anchor portion. For example, rotating the radial adjustment device could comprise rotating the rotary scale member manipulation portion (e.g. the flexure manipulation portion) relative to the anchor portion (e.g. the anchor portion could be rotationally fixed with respect to the machine part).

Optionally, the rotary scale member comprises a central axial opening extending therethrough and wherein the flexures are located around the inner circumference/perimeter of said central opening. In accordance advantageous embodiments of the invention, the diameter of any part of the machine part that extends at least partway through said central opening can be smaller than the smallest possible diameter of the central opening (e.g. as defined by the flexures).

In accordance with advantageous embodiments of the invention, the rotary scale member is not radially clamped directly to the machine part. Accordingly, in advantageous embodiments of the invention, the flexures are not radially pressed directly against the machine part. Rather, in advantageous embodiments of the invention, the flexures are radially pressed directly against radial adjustment member (s) and/or radial stop members which are not integral to the machine part.

The step of manipulating a radial adjustment device could be performed manually (e.g. via a human operator/installer) or automatically (e.g. via a robot). As will be understood, a tool, such as a screwdriver, or a hex or "Allen" key, could be used to manipulate the radial adjustment device.

As will be understood, the body of the rotary scale member can be fixed/secured/maintained at the adjusted radial location. Accordingly, the method can comprise fixing/securing the body at its adjusted radial location. Accordingly, the method can comprise fixing/securing the radial location of the body relative to the machine part in its adjusted radial location via fixing means, for example via one or more mechanical fasteners and/or adhesive. For instance, the radial location of the body relative to the part in its adjusted radial location could be maintained by said at least one radial adjustment device. Optionally, the method comprises fixing/securing the radial location of the body relative to the part in its adjusted radial location via means other than the at least one radial adjustment device. For example, a substance (such as an adhesive) or a mechanical fastener other than the radial adjustment device can be used. In this case, the at least one radial adjustment device can be removed or left in place.

A flexure can be provided either as a single flexure, or as a cluster of commonly acting flexures, for example a pair of flexures. Preferably, the direction and magnitude of the radial reaction force of each flexure in a flexure cluster or flexure pair is substantially/nominally the same. Accordingly, references above to at least three (e.g. at least four) flexures includes references above to at least three (e.g. at least four) clusters (e.g. pairs) of flexures.

The flexure(s) can be cantilevered flexure(s)/spring member(s). This can be particularly preferred when the flexures are provided in pairs. Each flexure member in a pair can be configured such that their free ends are proximal each other and their fixed (or "root") ends are distal each other.

Preferably, the series of position features defining the scale are integrally formed on the body. This is opposed to the series of position features defining the scale being formed on another substrate which is attached to the body. For example, the scale features could be formed on a flexible tape which is wrapped around the circumferential edge of the body of the rotary scale member.

Preferably, all of the at least three (e.g. at least four) flexures are substantially identical to each other such that the magnitude of the radial reaction force provided by them is nominally the same.

The flexure(s) can be (radially and optionally also tangentially) compliant/deflectable (e.g. by way of bending) in a plane perpendicular to the scale axis.

A (e.g. manually manipulable) radial adjustment device can be configured to act on a flexure so as change the extent of deflection of the flexure in said plane and thereby facilitate adjustment of the radial position of the rotary scale member relative to the part on which it is mounted.

Optionally, the at least three flexures are annularly spaced around the scale axis. Optionally, the at least three flexures are substantially equiangularly spaced around the scale axis. For example, in one embodiment, the rotary scale member comprises three (or three pairs of) annularly spaced flexures, located substantially 120° apart from each other.

The rotary scale member could comprise at least four radially-compliant, flexures. Accordingly, optionally, the rotary scale member comprises four (or four pairs of) annularly spaced flexures, located substantially 90° apart from each other.

The scale can extend annularly around the scale axis. The scale can extend continuously annularly around the scale axis. The scale could comprise an incremental scale. The scale could comprise one or more reference marks. The scale could comprise an absolute scale. The scale could comprise optical, capacitive, inductive and/or magnetic scale features. The scale can comprise one or more tracks of scale features. In the case of a scale disc member, the scale features could be radially-extending scale features. For example, the scale features could be elongate in the radial direction, e.g. each scale feature could comprise a line which extends radially, (with respect to the scale axis).

According to a second aspect of the invention there is provided an apparatus comprising a rotary scale member and a machine part which is configured to rotate about an axis of rotation. The rotary scale member can comprise a body on which a series of scale features defining a scale that extends around a scale axis is or can be provided. The rotary scale member can comprise at least three radially-compliant flexures spaced around said scale axis. The rotary scale member can be located on the machine part such that the scale axis and axis of rotation are substantially parallel. The apparatus can comprise at least a first radial adjustment device which can be arranged so as to contact both the machine part and the rotary scale member. The at least first radial adjustment device can be manipulated so as to radially displace the body of the rotary scale member. The apparatus can be configured such that at least the majority of any radial reaction force, generated as a result of the interaction of at least one of said flexures with a radial stop member against which it is radially pressed, and which is imparted on the at least first radial adjustment device by the rotary scale member in opposition to said radial displacement of the rotary scale member, is directed into, and reacted by, the machine part via the contact between the at least first radial adjustment device and the machine part.

According to a third aspect of the invention there is provided a method of mounting a rotary scale member on a machine part which is configured to rotate about an axis of rotation, the rotary scale member comprising a body on which a series of scale features defining a scale that extends around a scale axis is or can be provided, and at least three integral, radially-compliant, radial adjustment flexures, spaced around said scale axis, the method comprising: i) locating the rotary scale member on the machine part such that the scale axis and axis of rotation are substantially parallel, ii) subsequently manipulating at least a first radial adjustment device so as to adjust the radial location of the body of the rotary scale member with respect to the machine part. The method could be characterised in that: the at least first radial adjustment device comprises a flexure manipulating portion and an anchor portion, arranged such that at step ii) the flexure manipulating portion is configured to act against a radial adjustment flexure of the rotary scale member, and the anchor portion is mounted to the machine part such that: manipulation of the radial adjustment device causes a change in the radial displacement of at least a part of the radial adjustment flexure against which the flexure manipulation portion acts and thereby causes a radial displacement of the body of the rotary scale member At least the majority of any radial reaction force imparted on the flexure manipulating portion could be reacted by the machine part via the anchor portion so as to thereby hold the radial adjustment device at a radially fixed location.

According to a fourth aspect of the invention there is provided a method of mounting a rotary scale member on a machine part which is configured to rotate about an axis of rotation, the rotary scale member comprising a body on which a series of position features defining a scale that extends around a scale-axis, is or can be provided, and at least three integral, radially-compliant, flexure members, spaced around said scale-axis, the method comprising: i) locating the annular rotary scale member on a planar face of the machine part, said planar face extending perpendicularly to the axis of rotation, such that the scale-axis and axis of rotation are substantially parallel, ii) subsequently rotating one or more rotatable radial adjustment members so as to adjust the radial location of the body of the rotary scale member with respect to the machine part. The method could be characterised in that: a rotatable radial adjustment member comprises a flexure engaging portion and an anchor portion, the flexure engaging portion being in abutment with a flexure member of the rotary scale member, and the anchor portion being mounted to the machine part such that the flexure engaging portion can rotate about a radially fixed axis defined by the anchor portion, rotation of the flexure engaging portion causes a radial displacement of the flexure member against which the flexure engaging portion abuts and thereby causes a radial displacement of the body of the rotary scale member. At least the majority of any radial reaction force imparted into the flexure engaging portion could be reacted by the machine part via the anchor portion.

According to a further aspect of the invention there is provided a method of mounting a rotary scale member on a machine part which is configured to rotate about an axis of rotation, the rotary scale member comprising a body on which a series of scale features defining a scale that extends around a scale axis is or can be provided, and at least three radially-compliant flexures spaced around said scale axis, the method comprising: i) locating the rotary scale member on the machine part such that the scale axis and axis of rotation are substantially parallel, and ii) subsequently arranging at least a first radial adjustment device so as to contact both the machine part and the rotary scale member, and manipulating the at least first radial adjustment device so as to radially displace the body of the rotary scale member.

As will be understood, the features described above in connection with the first aspect of the invention are also applicable to the second, third and fourth aspects of the invention.

Embodiments of the invention will now be described, by way of example only, with reference to the following drawings, in which.

Figure 1:
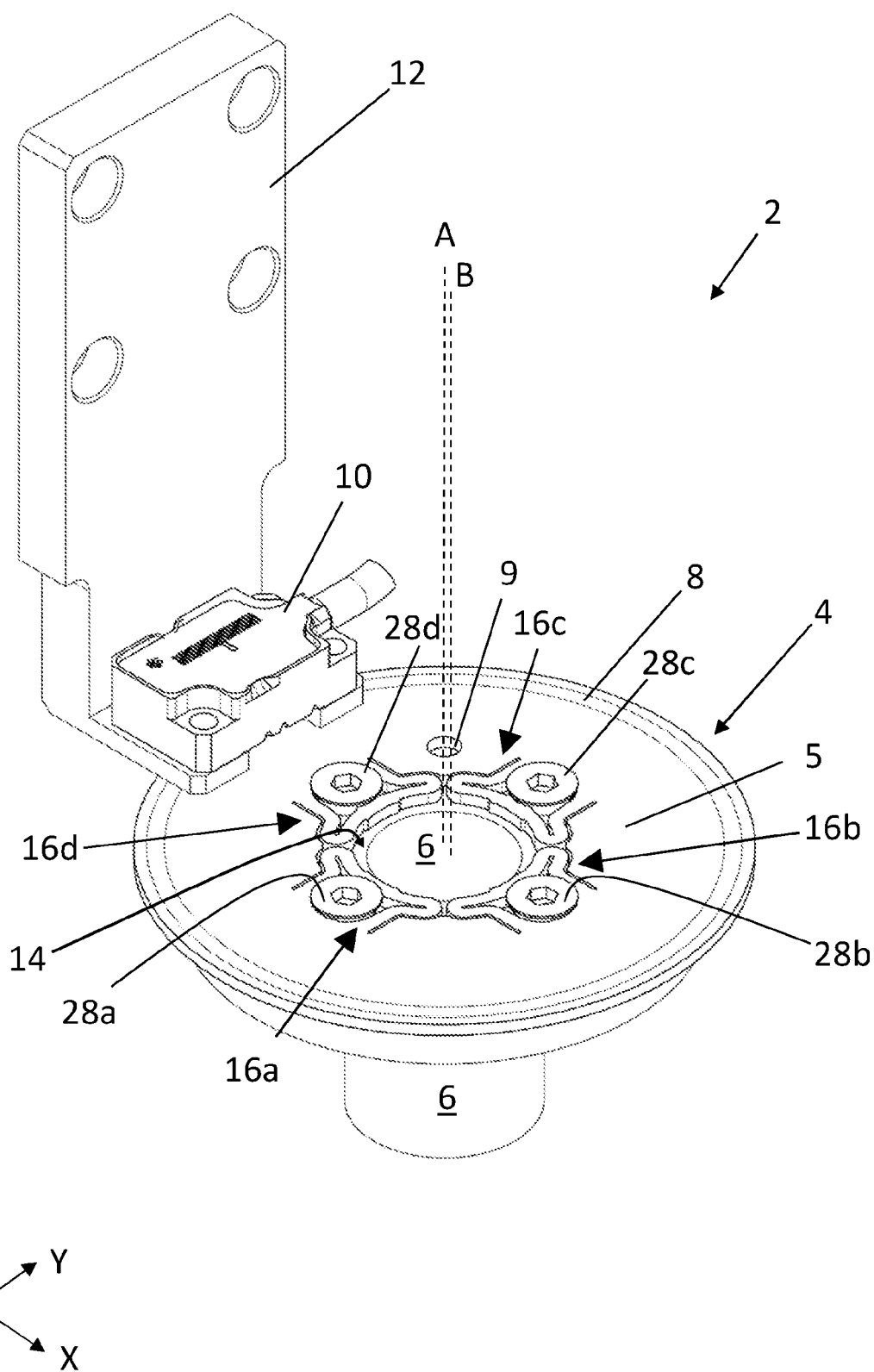
FIG. 1 is an isometric view of a scale disc member mounted according to the present invention on a shaft, with a readhead arranged to read the scale.
Figures 2, 3:
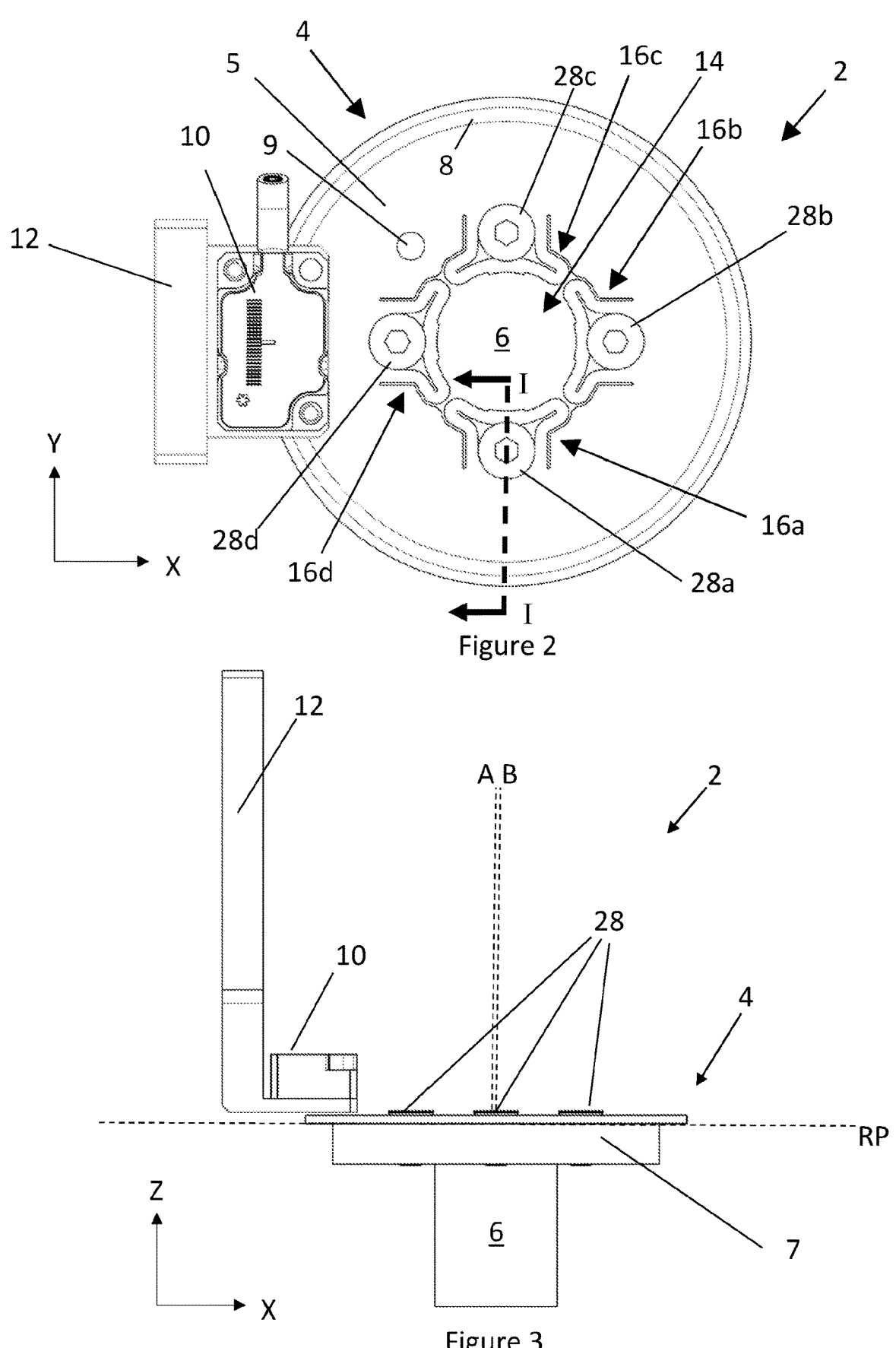
FIG. 2 is a plan view of the arrangement of FIG. 1.
FIG. 3 is a side view of the arrangement of FIG. 1.
Figure 6A:
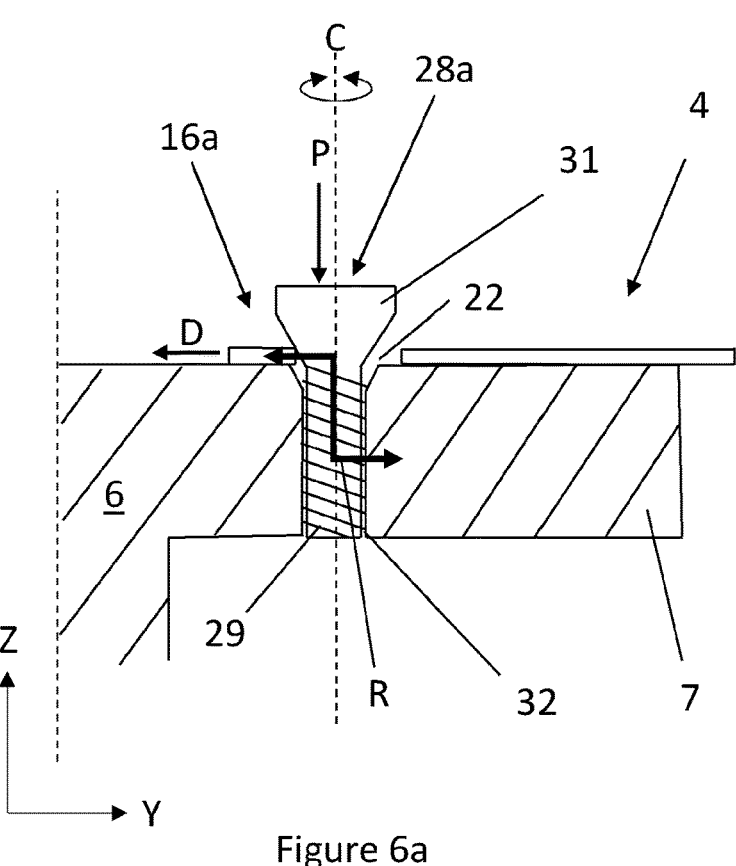
Figure 6B:
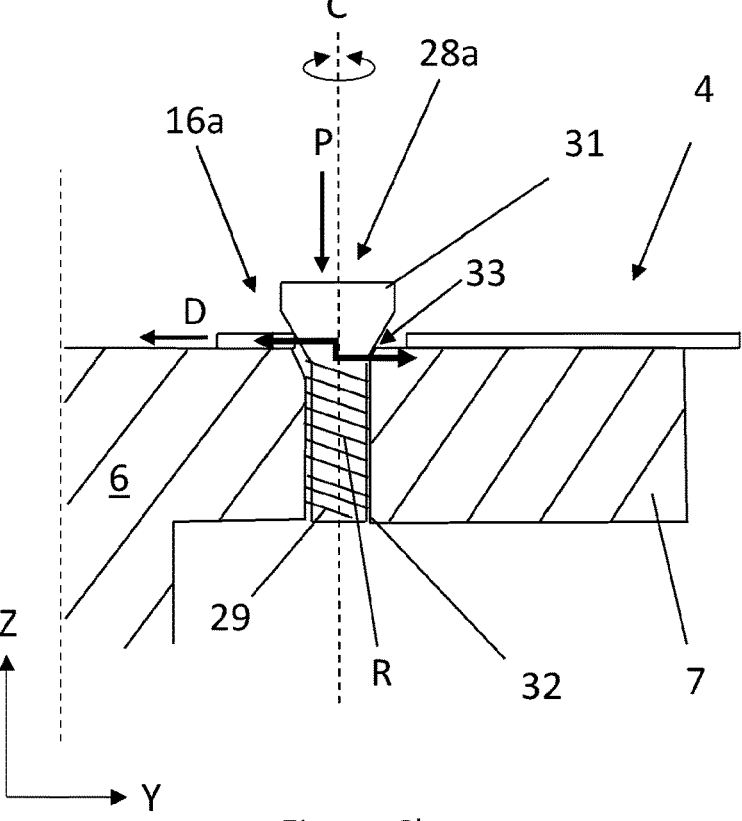
Figure 7:
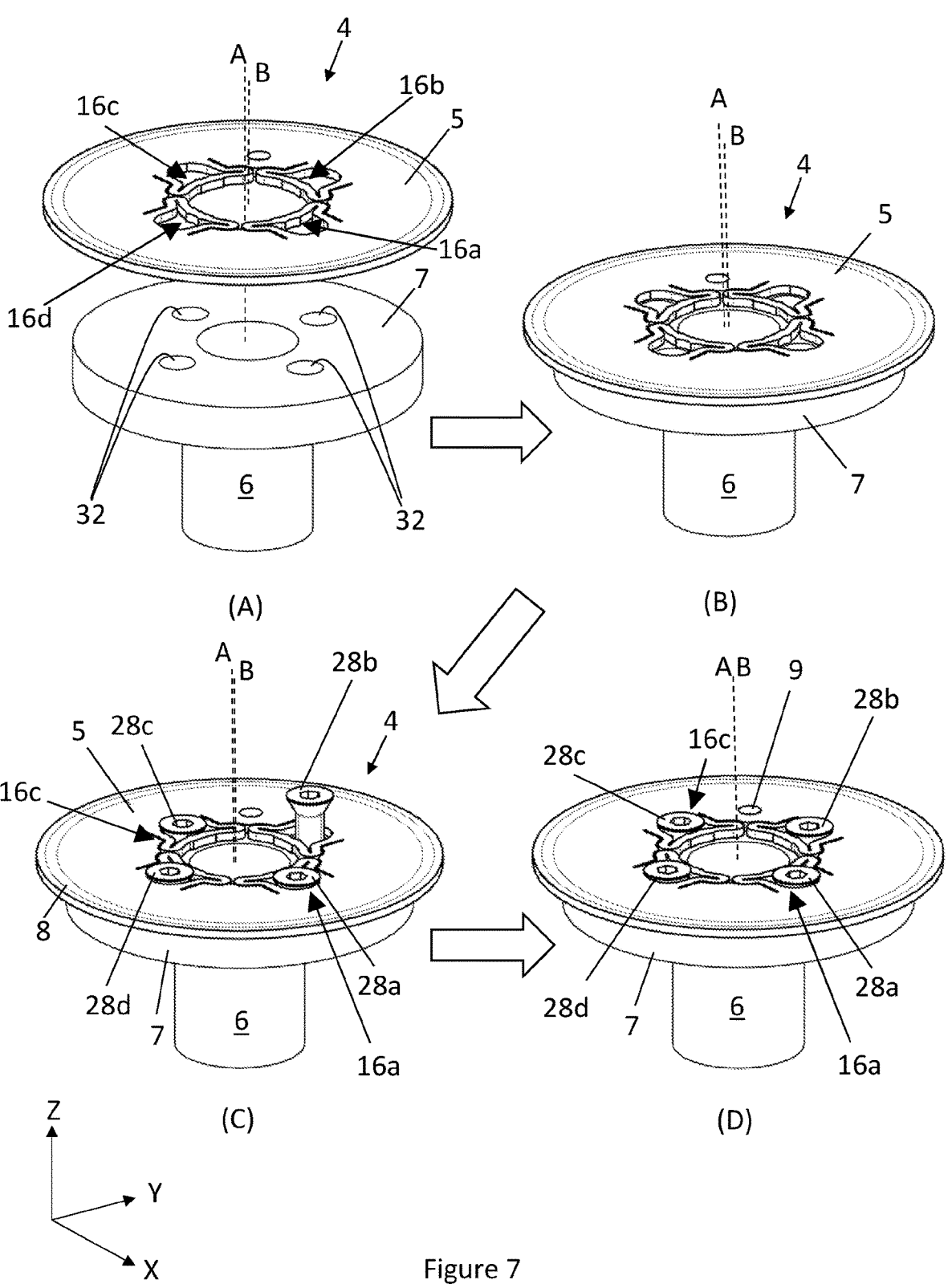
Figures 8A, 8B:
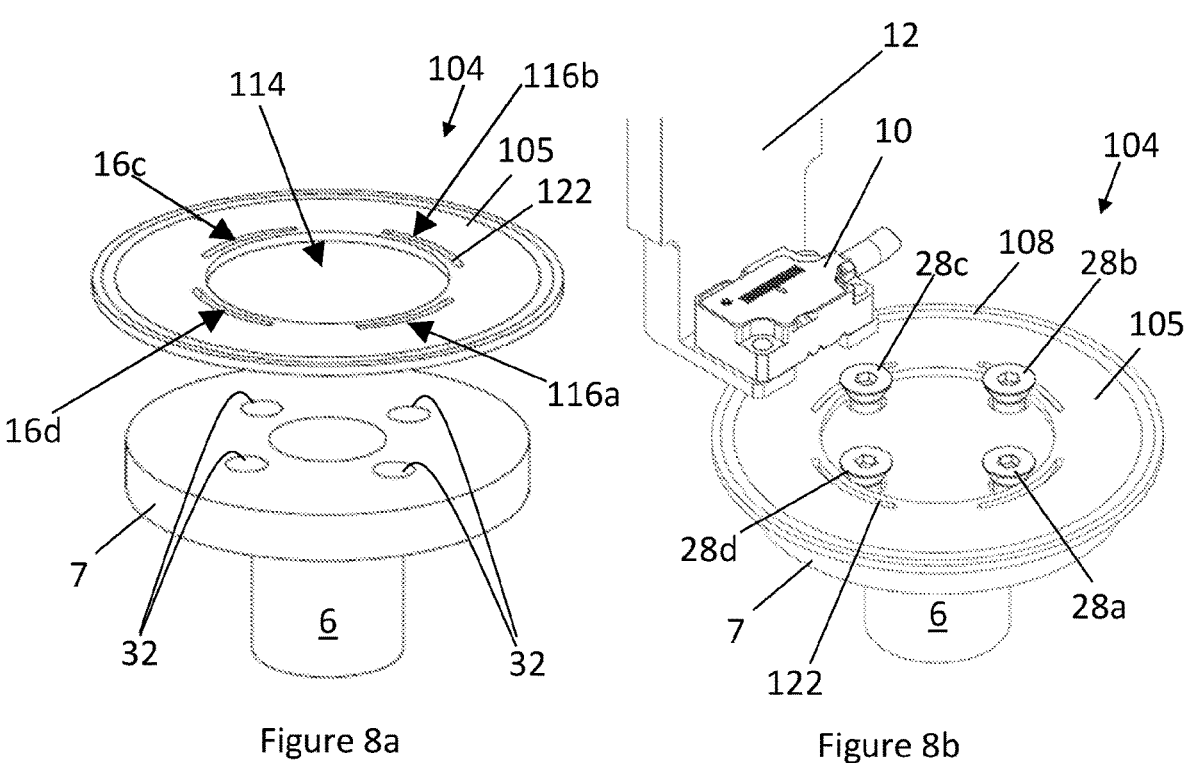
Figure 9:
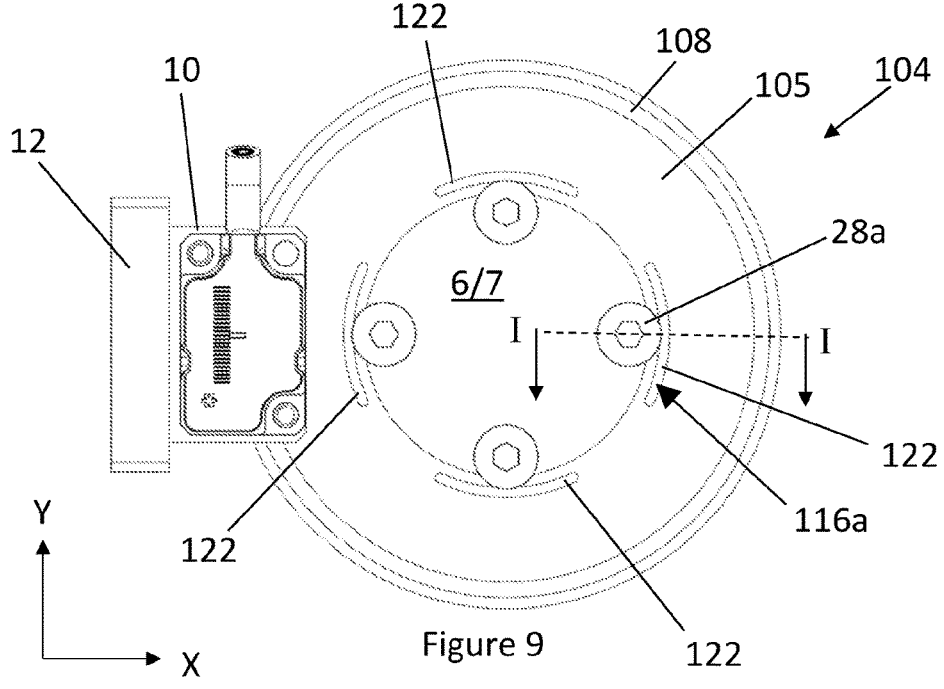
Figure 10A:
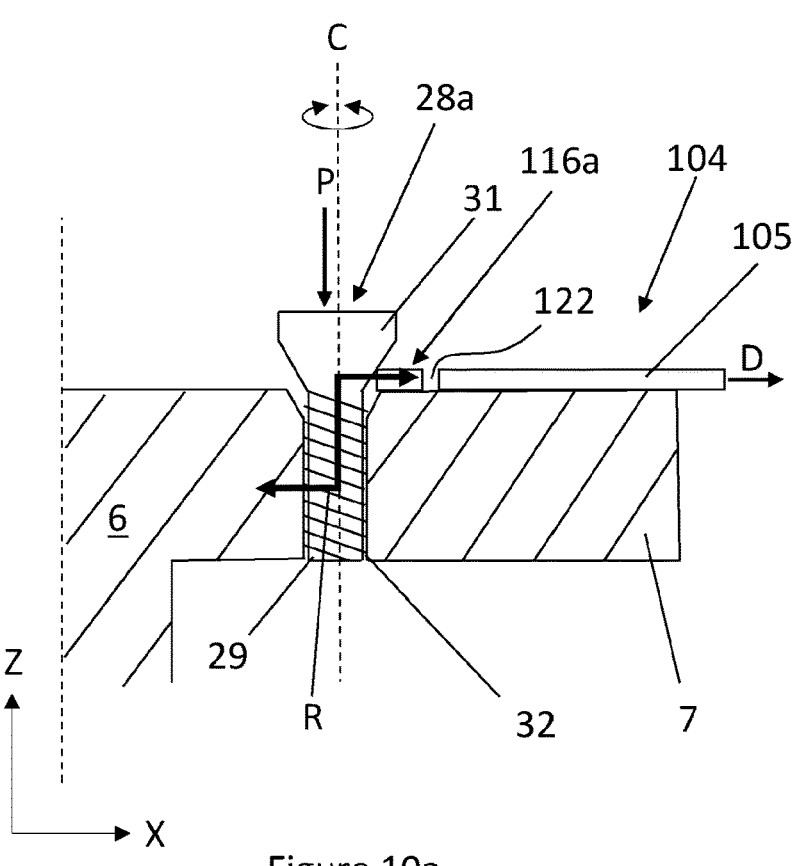
Figure 10B:
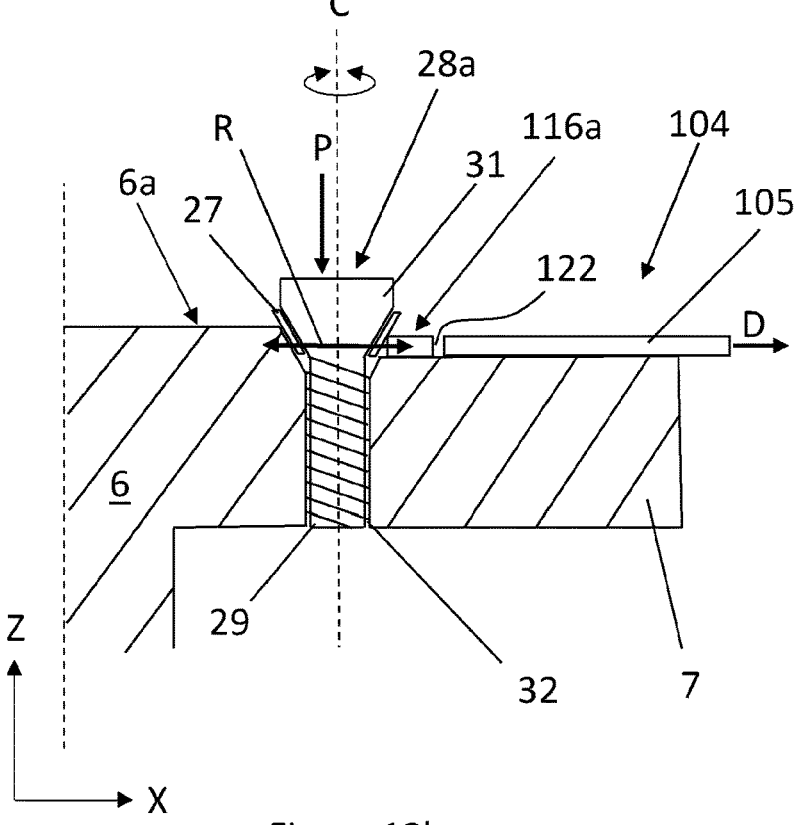
Figures 10C, 11:
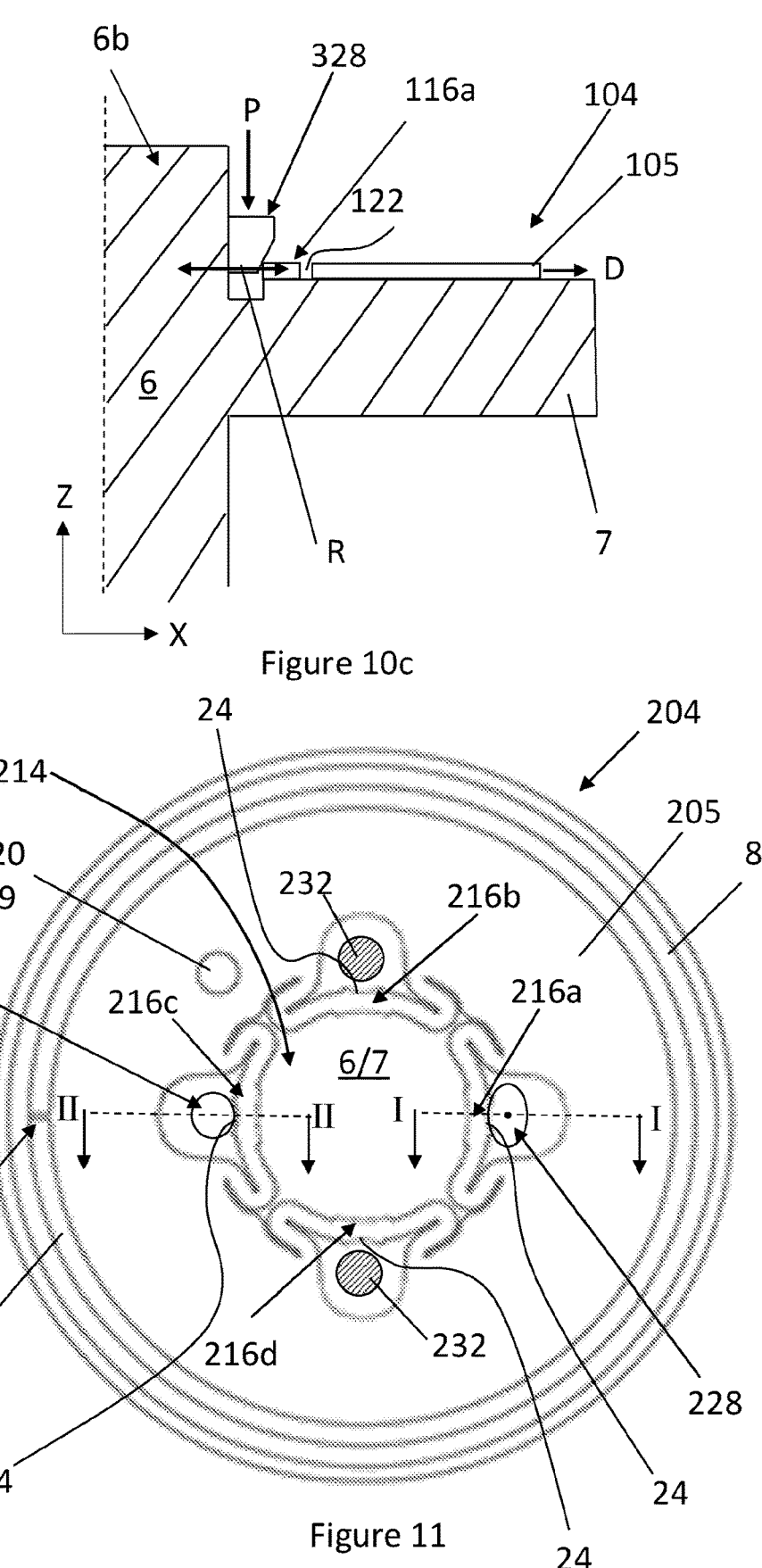
Figure 12A:
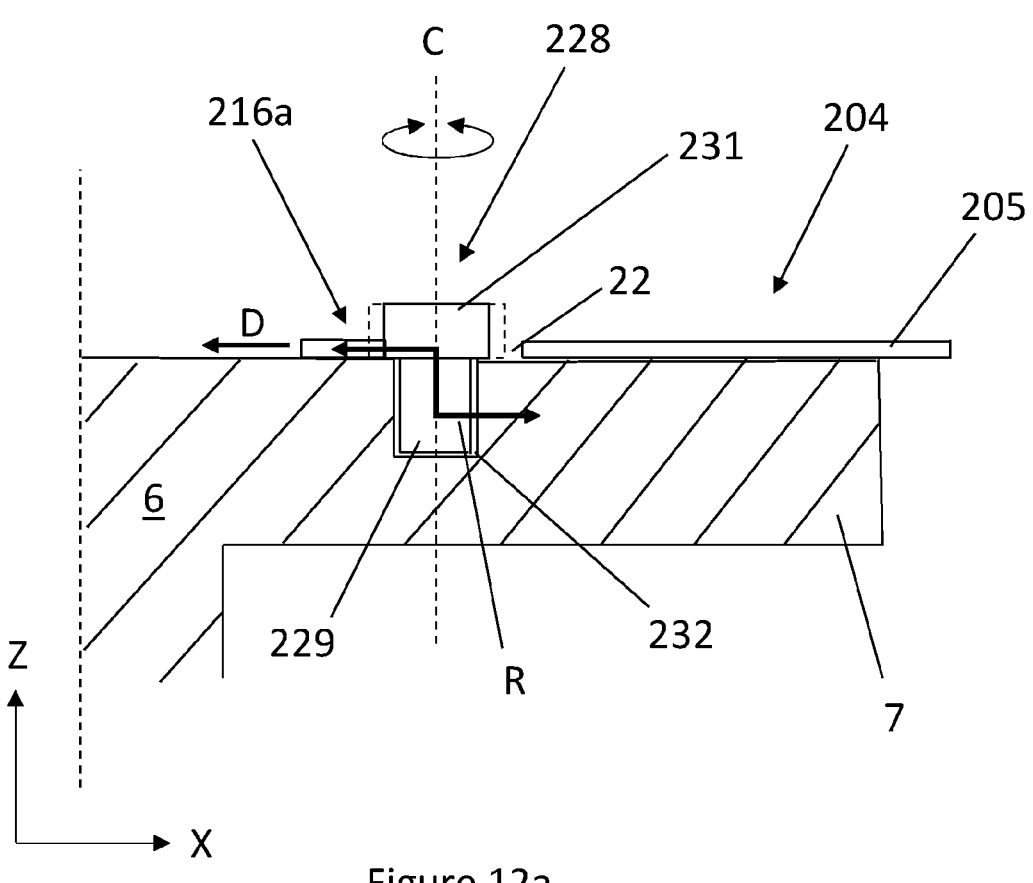
Figure 12B:
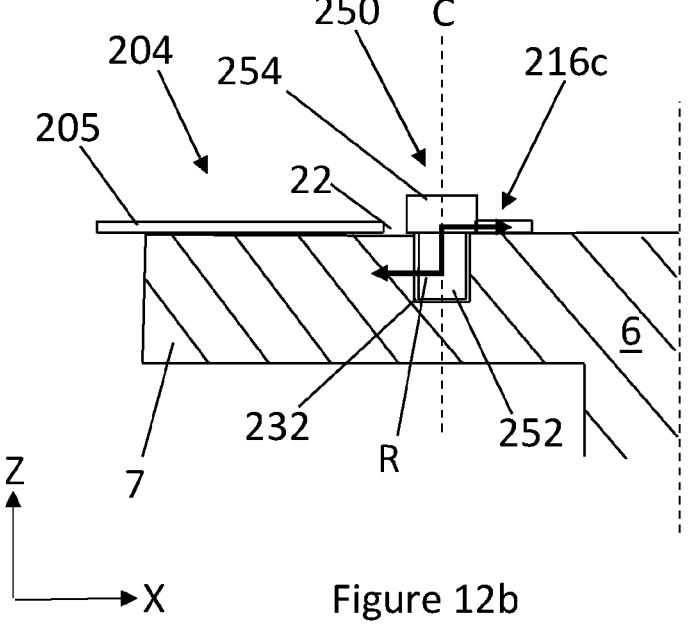
Figure 13:
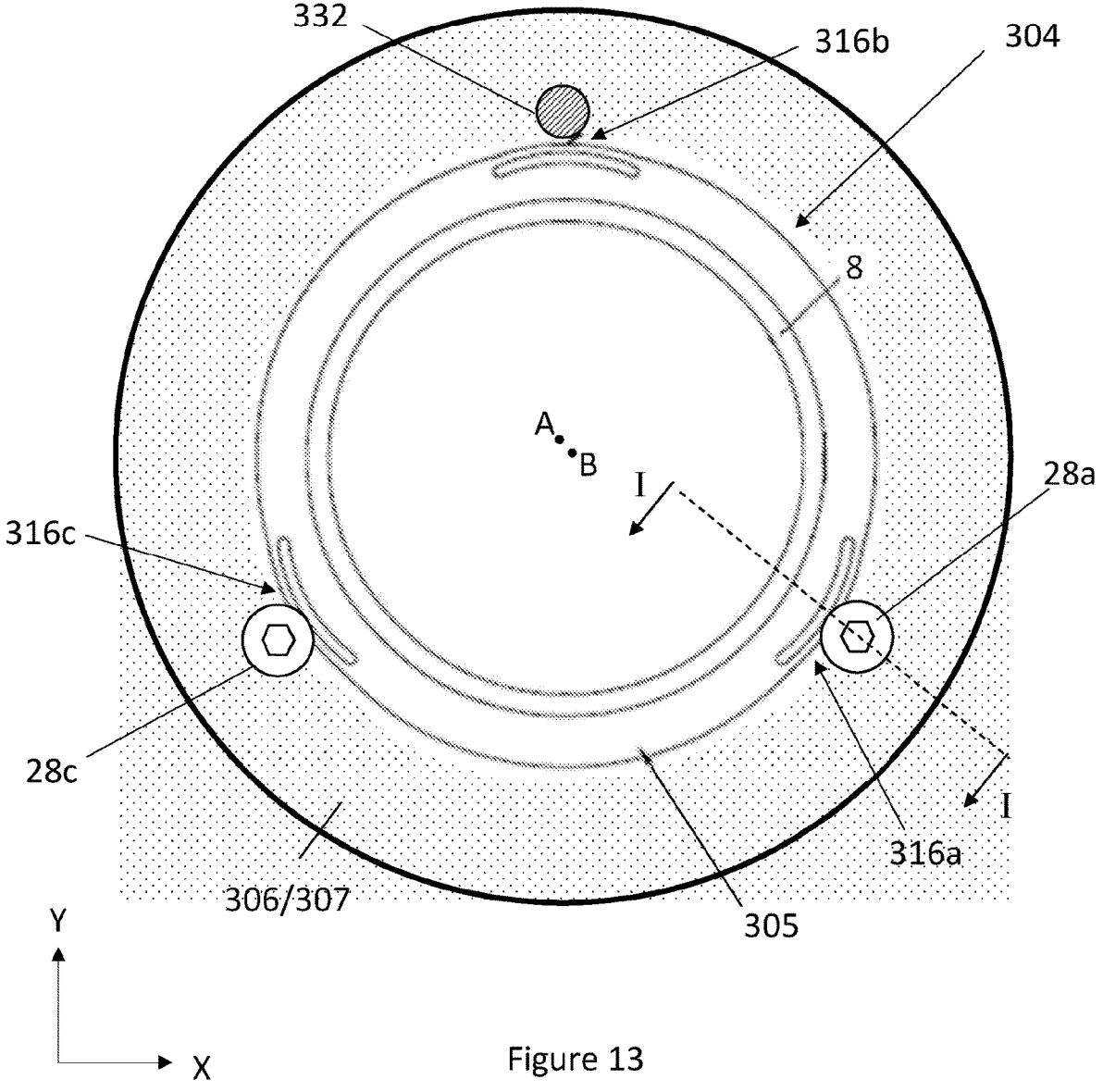
Figures 14, 16:
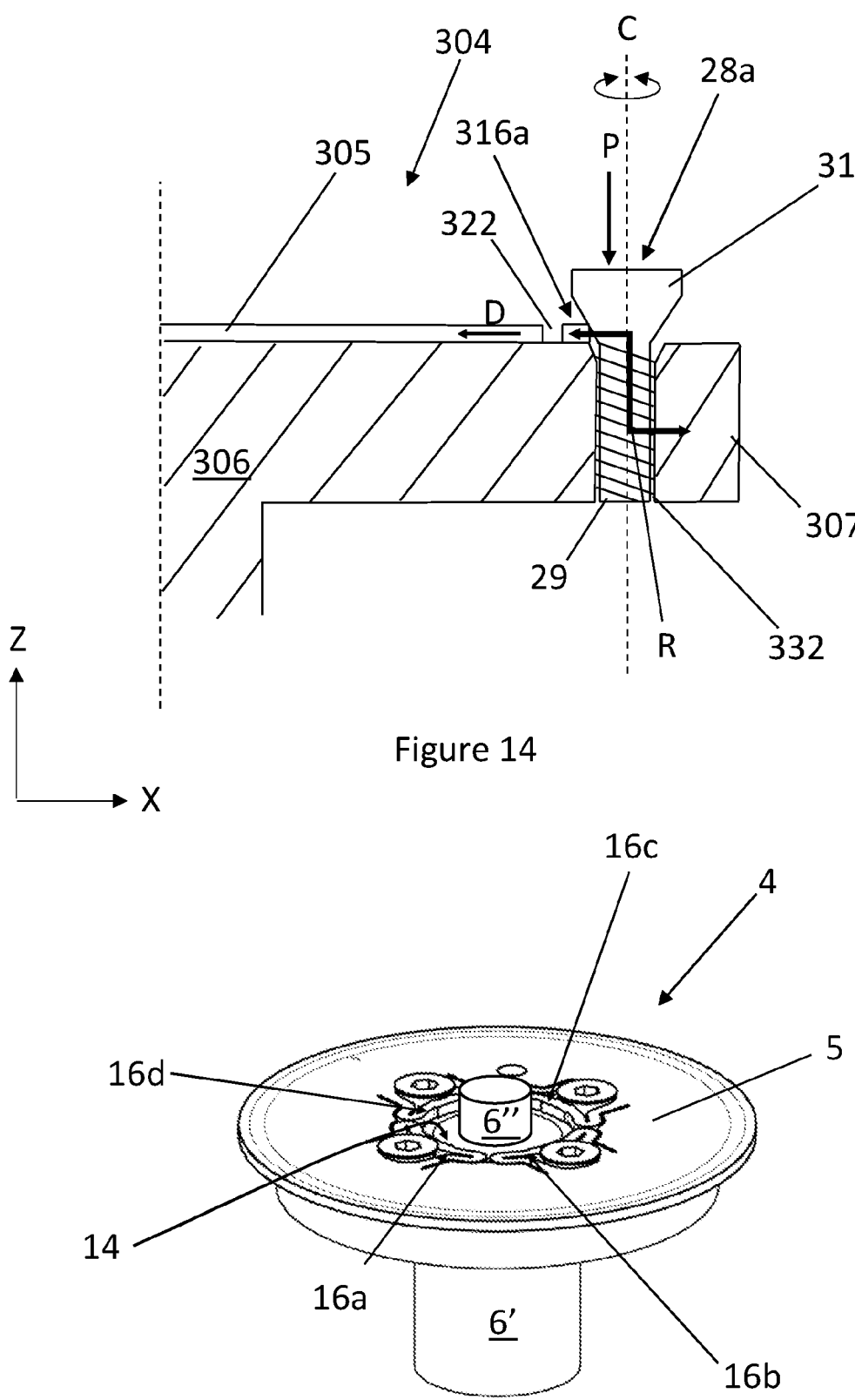
Figure 17A:
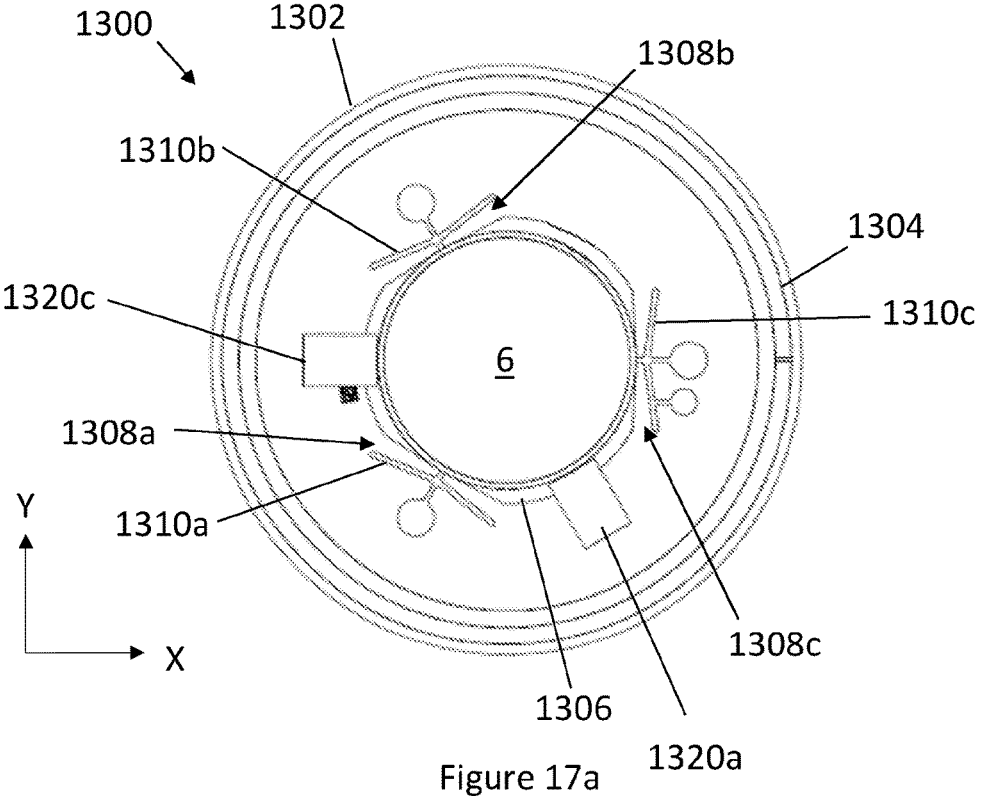
Figure 17B:
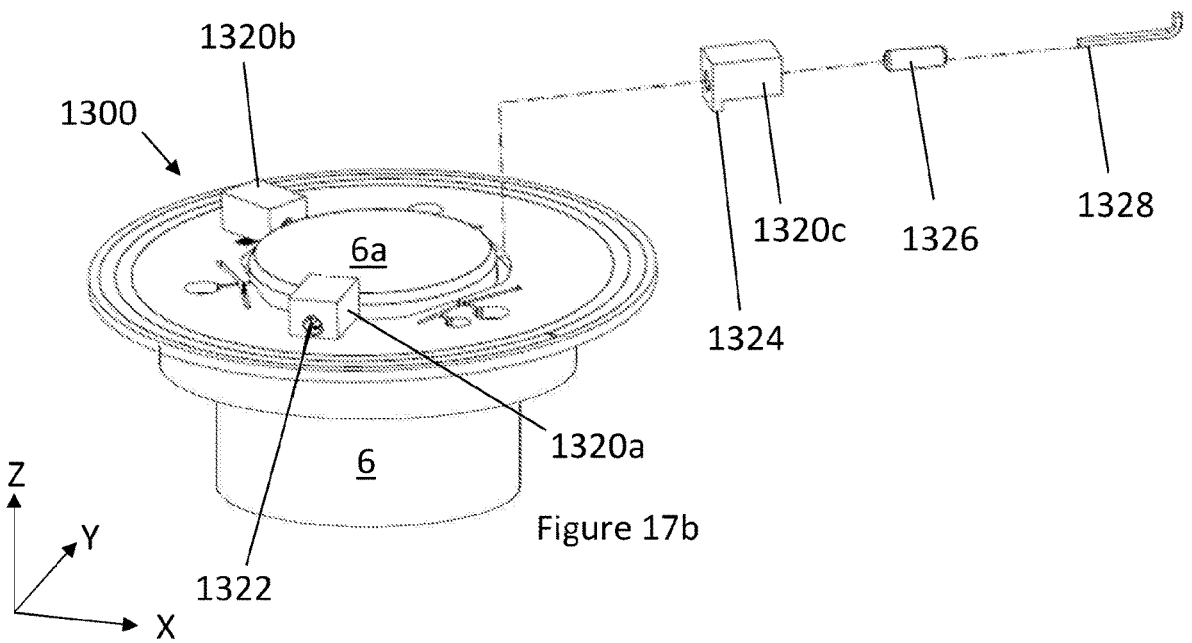

FIG. 6*a* is a cross-sectional view of the scale disc member mounted on the shaft, taken along line I-I of FIG. 2, according to an embodiment of the invention;

FIG. 6*b* is a cross-sectional view of the scale disc member mounted on the shaft, taken along line I-I of FIG. 2, according to a variation of the embodiment shown in FIG. 6*a*;

FIG. 7 schematically illustrates the steps of installing the scale disc member of FIGS. 1 to 6 in accordance with the present invention;

FIG. 8 shows an isometric view of an alternative embodiment of a scale disc member mounted according to the present invention;

FIG. 9 is a plan view of the arrangement of FIG. 8;

FIG. 10*a* is a cross-sectional view of the scale disc member mounted on the shaft, taken along line I-I of FIG. 9 according to an embodiment of the invention;

FIG. 10*b* is a cross-sectional view of the scale disc according to a variation of the embodiment shown in FIG. 10*a*;

FIG. 10*c* is a cross-sectional view of a further variation of the embodiments shown in FIGS. 10*a* and 10*b*;

FIG. 11 shows a plan view of an alternative embodiment of a scale disc member suitable for use with the method of the present invention;

FIG. 12*a* is a cross-sectional view of the scale disc member mounted on the shaft, taken along line I-I of FIG. 11;

FIG. 12*b* is a cross-sectional view of the scale disc member mounted on the shaft, taken along line II-II of FIG. 11;

FIG. 13 shows a plan view of an alternative embodiment of a scale disc member suitable for use with the method of the present invention;

FIG. 14 is a cross-sectional view of the scale disc member mounted on the shaft, taken along line I-I of FIG. 13;

Figure 15:
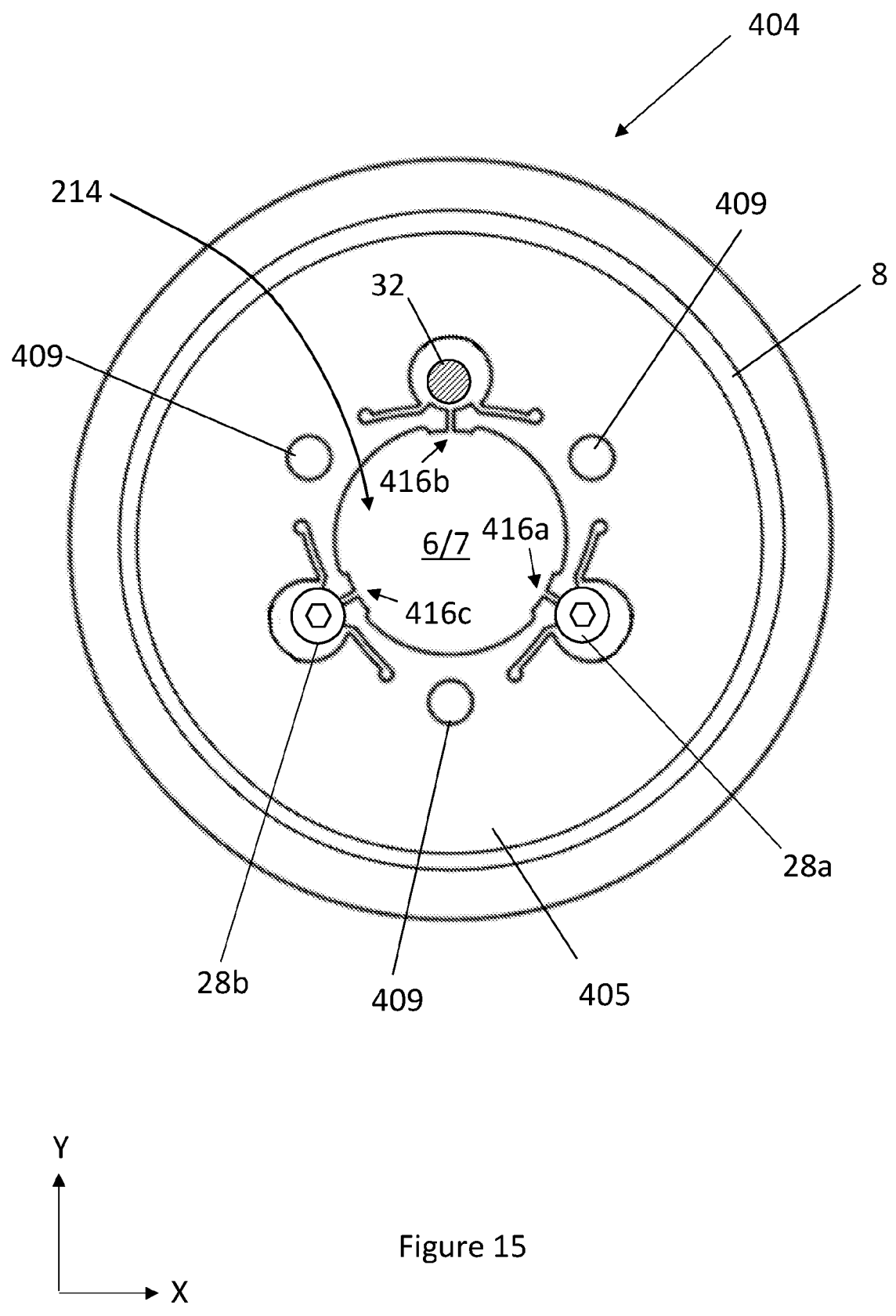

FIG. 15 is a plan view of an alternative embodiment of a scale disc member suitable for use with the method of the present invention;

FIG. 16 is an isometric view of the scale disc member of FIG. 1 mounted on a different machine part 6'; and FIGS. 17*a* and 17*b* illustrate another alternative embodiment of the invention which comprises the use of a plurality of nudge blocks for adjusting the radial position of the disc scale.

Referring to FIGS. 1 to 3 and 6, there is shown an encoder apparatus 2 mounted on a machine part 6 (e.g. on a rotatable shaft 6) and on a component 12 of the machine (not shown). The machine part 6 is configured to rotate about an axis of rotation A. FIGS. 1 to 3 (and 6) show the encoder apparatus 2 subsequent to it having been mounted in accordance with the method of the invention which is described in more detail below.

Figures 4, 5:
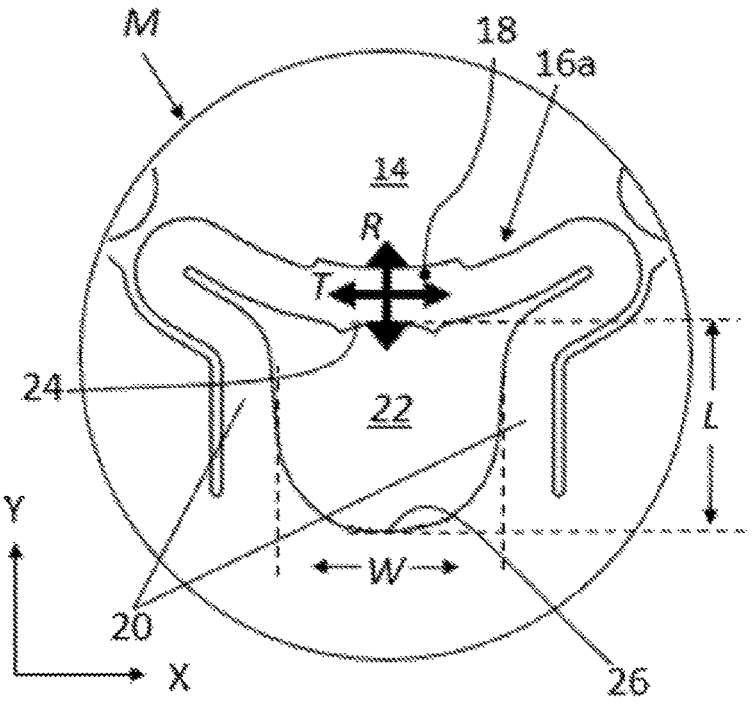
FIG. 4 is a plan view of the scale disc member of FIG. 1 shown in isolation.
FIG. 5 is a detailed view of the region M of the scale disc member of FIG. 4.

As shown, in this embodiment, the encoder apparatus 2 comprises a scale disc member 4 which is planar in configuration and mounted on the machine's shaft 6. FIGS. 4 and 5 show the scale disc member 4 of the encoder apparatus 2 in isolation.

The scale disc member 4 comprises a body/substrate 5 (in this embodiment a planar annular disc-like body 5) on which a series of position features defining a scale 8 that extends around a scale axis B is provided on one of its planar faces, and a plurality of integral flexures 16*a*, 16*b*, 16*c*, 16*d*. In this embodiment, the body 5 on which the scale track 8 is provided, and the plurality of flexures 16 are formed from/as a single piece of material. Forming them from a single piece of material can be advantageous, especially for thin planar scale disc, as it can help to ensure the compactness of the scale disc, as well as help to ensure that the flexures 16 are contained within the same plane as the annular body 5. In particular, in this embodiment, the scale disc member 4 (i.e. the annular body and the flexures) is formed from a thin sheet of material, in this embodiment stainless steel, which is about 1 mm thick. For context, the external diameter of the scale disc member 4 in this embodiment is about 55 mm. As will be understood, the invention is not limited to discs of such a size, and such dimensions are given merely as an example of a disc. Also, the disc could be made from other metallic materials, such as aluminium or plastic. Furthermore, in an alternative embodiment, the flexures could be provided on a member (e.g. a hub) which is formed separately from, but attached to, the scale disc member's body/substrate 5. However, it can be preferred that the flexures 16 are integrally formed on the body/substrate 5 (in other words, it can be preferred that the body/substrate 5 on which the scale track is provided and the flexures are formed from a single piece of material) because this helps to provide for a particularly compact rotary scale member, as well as helps to ensure that the radial reaction forces are contained in the plane of the body/substrate. For example, the body/substrate and the flexures could be formed (e.g. cut) from a single sheet or plate of material (e.g. metallic material).

As shown in FIG. 1, the scale track 8 extends completely and continuously annularly around the scale axis B. Although not shown in detail in FIG. 1, the scale track 8 comprises a series of features which a readhead 10 can read to determine the relative position/motion of the scale disc 4 and the readhead 10.

The readhead 10 is mounted on a component 12 of the machine which is fixed such that the shaft 6 can rotate relative thereto about the axis of rotation A.

In the embodiment described, the encoder apparatus 2 is an optical encoder apparatus, but this need not necessarily be the case. For instance, the encoder apparatus could be a magnetic, inductive or capacitive encoder apparatus. Furthermore, in the embodiment described, the encoder apparatus 2 is a reflective optical encoder apparatus (in that the light from the readhead is reflected by the scale back toward the readhead, and in that the readhead's illumination and scale detection components are on the same side of the scale). However, this need not necessarily be the case, and the encoder apparatus could be a transmissive optical encoder (or as mentioned above, could be a magnetic, inductive or capacitive encoder apparatus).

In this embodiment, the encoder apparatus 2 is an incremental encoder apparatus. Accordingly, in this embodiment the scale disc 4 is an incremental scale disc and the scale track 8 comprises a series of periodically arranged features which the readhead 10 can read in order to provide a count of the relative position/movement of the scale disc 4 and the readhead 10. As is common in the field of incremental encoder apparatus, the scale disc member 4 could comprise one or more reference marks which can be read by the readhead when it passes the readhead, so that the readhead can identify a reference position on the scale disc member. An example reference mark 15 is shown in FIG. 4. In this case, the reference mark 15 is shown in a track 17 separate to the incremental scale track 8, but this need not necessarily be the case. The reference mark 15 could be embedded within the incremental scale track 8. The encoder apparatus could be an absolute encoder apparatus. Accordingly, the scale disc 4 could be an absolute scale disc, in which the scale track(s) thereon comprises features defining a series of unique absolute positions such that the absolute position of the scale disc and readhead can be determined on start-up without requiring relative motion of the scale disc member and the readhead. As will be understood, an absolute scale disc can also comprise one or more incremental scale tracks.

An installer can install the scale disc member 4 on the machine part 6 by placing the scale disc member 4 on the machine part such that the scale axis B and the axis of rotation A of the machine part are substantially parallel. In this case, the scale disc member 4 is located on a reference plane RP (see FIG. 3) defined by a flat end-face 7 of the machine part 6. As will be understood, the reference plane RP does not need to be provided by a flat surface. Instead, for instance, the reference plane RP could be provided by protruding seats (e.g. three hemispheres arranged equiangularly around the axis of rotation A) on which the scale disc member 4 rests. It is unlikely that the installer will have placed the scale disc member 4 in the ideal radial location. For instance, it might be desired that the scale disc member 4 is positioned such that the scale axis B and the axis of rotation A are substantially coaxial (or have some other preferred defined relationship/offset), which if left unchanged could cause errors (e.g. eccentricity errors) in the signal obtained by the readhead 10. Accordingly, it can be desirable for the installer to be able to tweak the radial location of the scale disc member 4. In the applications and apparatus in which the inventor's discs are likely to be used, it is unlikely that adjustments of greater than 500 μm would ever be required, and it could be that the extent of the adjustment is a small as a couple of microns, or even less than a micron. It needs to be borne in mind that not only is the extent of adjustment required miniscule, but that the installer also needs to be able to effect such an adjustment in a predictable and consistent manner. Being able to effect such an adjustment in a predictable and consistent manner means that the installer does not need to work on a trial-and-error basis, which is very time consuming and could also result in making the set up worse. Below is described a number of different ways of implementing such an improved configuration for adjusting the radial location of a scale disc member 4.

As shown most clearly in FIG. 4, the scale disc member 4 comprises a hole 14 through its middle. The scale disc member 4 comprises four integral, radially-compliant flexures 16(*a, b, c, d*) which are provided in plane with the planar disc and are spaced equiangularly around the hole 14. The flexures 16 are resiliently compliant in the radial direction (with respect to the scale disc member 4). Accordingly, the flexures 16 could be referred to as "radial spring members". As described in more detail below, the flexures are used to aid adjustment of the radial location of the scale disc member 4 and so could be referred to as radial adjustment flexures.

In the example embodiment of FIGS. 1 to 6, as well as the flexures 16 being radially compliant (e.g. along the direction "R" in FIG. 5), they are also configured with tangential compliance (e.g. along the direction "T" in FIG. 5). In the currently described embodiment, tangential compliance is achieved by providing a specially shaped flexure. As shown most clearly in FIG. 5, the flexure 16 comprises a "seat" or "foot" portion 18 against which a radial adjustment device 28 is configured to engage as described in more detail below. The foot portion 18 extends between a pair of elongate flexure legs 20, which themselves extend from the annular body 5, into the hole 14. The foot portion 18 and the flexure legs 20 are formed from the same piece of material as the annular body 5, and define a flexure void 22. As shown in FIG. 5, a contact face 24 is provided on the void-side of the flexure foot 18. As explained in more detail below in connection with FIGS. 6 and 7, a radial adjustment device 28 can be located through the flexure void 22 such that a tapered head 31 of the adjustment bolt 28 can engage and push against the contact faces 24 so as to adjust the radial position of the annular body 5 and hence adjust the radial position of the scale 8 formed thereon and the scale axis B. In the embodiment described, the tapered head 31 has conical shape/form.

The foot portion 18 is resiliently compliant in the radial direction R, by virtue of it being able to bend along its length, within the plane of the disc, and the foot portion 18 is resiliently compliant in the tangential direction T, by virtue of the pair of flexure legs 20 being able to bend along their length, within the plane of the disc.

The flexures 16, in particular the flexure foot 18 and elongate legs 20 (and the flexure void 22) can be formed, for instance, by etching and/or machining (e.g. laser cutting) the annular body 5. Optionally, the annular body 5, along with its flexures 16, is formed by a moulding, casting and/or additive process.

Tangential compliance of the flexure is optional, and indeed the flexures of some of the embodiments described below are not configured to be tangentially compliant. Optionally, if desired, the radial adjustment device could be configured to provide for tangential compliance. For instance, the radial adjustment device could comprise a roller which is radially stiff but which allows the disc to slide sideways across it tangentially.

A method of mounting the scale disc member 4 of FIGS. 1 to 6 to a machine part 6 will now be described with reference to FIG. 7. As schematically illustrated in FIGS. 7(A) and 7(B), the method begins by an installer placing the scale disc member 4 on a reference plane RP (see FIG. 3), in this case a plane defined by an end-face 7 of the machine part/shaft 6. At this point in the process, the flexures 16*a*, 16*b*, 16*c*, 16*d* are in a non-flexed (i.e. relaxed) state. As shown in FIG. 7(A), the machine part 6, in particular in this embodiment the end-face 7, comprises a plurality of threaded holes 32, which as described in more detail below are for receiving radial adjustment devices 28. As will be clear from the description below, in the embodiment of FIGS. 1 to 7 each of the radial adjustment devices 28 also perform the function of a stop member. Accordingly, items 28 could be referred to as radial adjustment devices/stop member 28, but for brevity they shall only be referred to herein as radial adjustment devices 28.

As illustrated schematically in FIG. 7(B), the initial radial location of the scale disc member 4 is such that the axis of rotation A and scale axis B are not coaxial, but rather have a significant amount of offset such that if the scale disc member 4 were left in its initial radial location there would be substantial unwanted eccentricity error in the signal obtained by the readhead 10.

Accordingly, once the scale disc member 4 is located on the reference plane RP/end-face 7, the installer can check the radial position of the scale disc member 4. This could be achieved mechanically, for example using a Dial Test Indicator (DTI) on the outer edge of the disc as it is rotated. Optionally, an optical method could be used. For example a microscope could be used to look at the edge of the scale lines. As another example, a pair of readheads could be configured to read the scale features and the count difference between them can provide a measure of eccentricity. If the radial position is not satisfactory, the installer can fine tune the radial position of the scale disc member 4. As illustrated by FIG. 7(C), this is achieved via the use of one or more radial adjustment devices 28 which in the embodiment described comprise adjustment bolts 28.

As shown in more detail in FIG. 6*a*, in this embodiment a radial adjustment device 28 comprises a radial adjustment bolt 28*a* which comprises an anchor portion 29 and a flexure manipulation portion 31. In the embodiment described, the anchor portion 29 comprises a threaded portion 29, and the flexure manipulation portion 31 comprises a tapered head 31. As shown in FIG. 6, the radial adjustment bolt 28*a* can be received through the flexure void 22 of a first flexure 16*a*, such that a threaded portion 29 of the radial adjustment bolt 28*a* is received within a threaded hole 32 in the end face 7 of the shaft 6. As per a normal threaded member, the radial adjustment bolt 28*a* can be rotated so as to change its axial position. FIG. 6*a* shows the configuration where the radial adjustment bolt 28*a* has been located in the threaded hole 32 and rotated (e.g. clockwise) about an axis C until its axial position is such that the tapered side of the tapered head 31 is just touching the contact face 24 on the foot portion 18 (described above in connection with FIG. 5) of the first flexure 16*a*. As shown in FIG. 6*a*, the scale disc member 4 (in particular its voids 22), the machine part 6 (in particular its threaded holes 32), and the radial adjustment bolt 28*a*, are configured such that the tapered head 31 of the adjustment bolt 28 contacts only the contact face 24 of the foot portion 28; i.e. there is a gap between the tapered head 31 and the legs 20 and also a gap between the tapered head 31 and the back face 26 of the void 22. Accordingly, as the radial adjustment bolt 28*a* is further rotated about the axis C to cause it to penetrate further (in the direction indicated by arrow P in FIG. 6*a*) into the threaded hole 32, and because the radial position of the radial adjustment bolt is fixed, and in particular the axis C about which it is rotated is radially fixed, the tapered head 31 will cause the contact face 24/foot portion 18 of the flexure 16*a* to be radially inwardly displaced (in the direction indicated by arrow D) which in turn will cause the body/substrate 5 of the scale disc member 4 to be displaced accordingly (thereby causing the radial position of the scale 8 formed thereon and the scale axis B to be displaced accordingly). Any reaction force against such a displacement (e.g. due to friction and/or due to a resistance/reaction force provided by another radial adjustment bolt/stop member, as described in more detail below), will in turn be directed into and reacted by the machine part 6 via the contact between the radial adjustment bolt's anchor portion 32, and the threaded part of the hole 32 in the machine part, as schematically illustrated by arrow R in FIG. 6*a*.

FIG. 6*b* illustrates an alternative embodiment which is substantially the same as that shown in FIG. 6*a*, except that the countersunk feature at the mouth of the threaded hole 32 in the machine part is configured such that it is smaller on its radial back-side (e.g. on the right-hand side 33 as viewed in FIG. 6*b*) compared to its radial front-side (e.g. its left-hand side as viewed in FIG. 6*b*) so that the threaded head 31 will contact the counter-sunk feature on its back-side, but not its front-side. Accordingly, as the radial adjustment bolt 28*a* is rotated about the axis C to cause it to penetrate further (in the direction indicated by arrow P in FIG. 6*b*) into the threaded hole 32, the contact between the tapered head 31 and the back-side 33 of the countersunk feature will cause the tapered head 31 to be pushed radially inward which in turn will cause the contact face 24/foot portion 18 of the flexure 16*a* to be radially inwardly displaced (in the direction indicated by arrow D) which in turn will cause the body/substrate 5 of the scale disc member 4 to be displaced accordingly (thereby causing the radial position of the scale 8 formed thereon and the scale axis B to be displaced accordingly). Any reaction force against such a displacement (e.g. due to friction and/or due to a resistance/reaction force provided by another radial adjustment bolt/stop member, as described in more detail below), will in turn be directed into and reacted by the machine part 6 via the contact between the radial adjustment bolt's tapered head 31, and the countersunk feature at the mount of the hole 32 in the machine part, as schematically illustrated by arrow R in FIG. 6*b*. As will be understood, in contrast to the embodiment of FIG. 6*a* the radial adjustment bolt needs to have sufficient play within the hole 32, or be sufficiently flexible/compliant, such that the radial adjustment bolt can be positioned at different axial depths within the hole 32 without locking up.

As illustrated in FIGS. 7(C) and 7(D), in a preferred method according to the invention, adjustment bolts 28 are also located in opposing flexure voids, and initially set up (i.e. before any radial adjustment action takes place) such that their tapered head 31 is just touching the contact face 24 on the foot portion 18 as described above in connection with FIG. 6*a*. This is preferable because in such a configuration the action of manipulating a "first" of the two opposing radial adjustment bolts (e.g. bolt 28*a*) so as to displace the contact face 24/foot portion 18 of the flexure it is in engagement with (e.g. flexure 16*a*), will in turn cause the contact face 24/foot portion 18 of the opposing flexure (e.g. flexure 16*c*) to be urged into the tapered head 31 of the opposing "second" radial adjustment bolt (e.g. bolt 28*c*). Due to the second radial adjustment bolt 28*c* being radially fixed/anchored to the machine part 6/end-face 7 via its anchor portion 29, it reacts against said urging. Therefore, when the first radial adjustment bolt 28*a* is manipulated/rotated so as to effect a radial displacement of the body/substrate 5 of the rotary scale member 4, the second radial adjustment bolt 28*c* is/performs the function of a radial stop member. Accordingly, the opposing "second" flexure 16*c* will flex so as to facilitate displacement of the body/substrate 5 on which the scale is formed, but at the same time it will provide a radial resistance/reaction force against the displacement. This can be advantageous because it helps to provide a convenient controlled way for the displacement D which was effected by manipulating the first flexure 16*a* to be undone, simply by rotating the first radial adjustment bolt 28*a* in the opposite direction (e.g. anticlockwise) about the axis C. Rotating the first radial adjustment bolt 28*a* in the opposite direction (e.g. anticlockwise) will reverse the radial adjustment bolt 28*a* out of the threaded hole 32, thereby reducing the extent to which its tapered head 31 causes the contact face 24/foot portion 18 of the flexure 16*a* to be displaced, and due to the radial reaction force provided by the opposing second radial adjustment bolt 28*c*, the contact face 24/foot portion 18 of the flexure 16*a* will move backward (in the direction opposite to that indicated by arrow D) which in turn will cause the body/substrate 5 of the scale disc member 4 to be displaced backwards accordingly (i.e. radially outwardly in this embodiment).

As will be understood, in this embodiment, if the second radial adjustment bolt 28*c* is manipulated/rotated, it too can be used to effect a radial displacement of the body 5 of the rotary scale member 4. As will be understood, during such manipulation/rotation of the second radial adjustment bolt 28a, the opposing first radial adjustment bolt 28a will perform the function of a radial stop member.

It is not necessary for a device which can perform the function of both a stop member and a radial adjustment member to be located against an opposing flexure in order to facilitate such undoing/reversibility of the radial displacement. Instead, a dedicated stop member (i.e. one which is configured for the sole function of a radial stop member and is not configured to be used as a radial adjustment device) could be located against the opposing flexure so as to provide such radial reaction force. Such a dedicated stop member could, for instance, comprise a rigid cylindrical peg which is inserted in the hole 32 of the machine part 6/end-face 7, and which has a cylindrical head sized so as to abut the contact face 24/foot portion 18 of the opposing flexure. An example embodiment where a dedicated stop member is used is provided in connection with FIGS. 11 and 12.

As shown in FIGS. 7(C) and (D), as well as the first 28a and second 28c radial adjustment bolts being arranged against the opposing first 16a and second 16c flexures (so as to effect radial adjustment in a first dimension—the X-dimension), it might be necessary to arrange and use third 28b and fourth 28d radial adjustment bolts against the opposing third 16b and fourth 16d flexures (so as to effect radial adjustment in a second dimension—the Y-dimension).

In such a case, the control and predictability of the radial adjustment of the disc scale member 4 in one dimension (e.g. in the X-dimension) via one pair of opposing radial adjustment bolts and flexures (e.g. via the first 28a and second 28c bolts and first 16a and second 16c flexures) can be improved by virtue of the above-described tangential compliance of the other pair of opposing flexures (e.g. the third 28b and fourth 28d flexures).

In particular, when, for instance, the radial position of the scale disc member 4 is changed along the X dimension via manipulation of the first radial adjustment bolt 28a, the third 16b and fourth 16d flexures will laterally bend/distort in the X-dimension in order to accommodate the change in radial position of the annular body 4 in the X-dimension (in particular, the flexure legs 20 of the third 16b and fourth 16d flexures will bend along their length within the plane of the scale disc member). Such flexing of the flexures 16 means that the radial position of the annular body 5 relative to the shaft 6 can be adjusted without needing to overcome the stiction between the third 28b and fourth 28d radial adjustment bolts and the foot portions 18 of the corresponding third 16b and fourth 16d flexures.

When the scale disc member 4 is in the desired radial position, then it can be secured in place. This could be achieved, for instance, by clamping and/or gluing the scale disc member 4 to the machine part 6/end-face 7. For example, one or more supplemental fastener hole(s) 9 could be provided through the body/substrate 5 on which the scale is provided, through which a fastener such as a clamping bolt can be passed and secured to the shaft (e.g. via a hole in the end-face 7), so as to clamp the annular body 5 in place. If desired, the radial adjustment bolt(s) 28 could then be removed.

An alternative embodiment of the invention will now be described with reference to FIGS. 8 to 10. Similar to the above-described embodiment, this embodiment comprises a disc scale member 104 which is to be mounted on a machine part 6 comprising an end-face 7 having a plurality of threaded holes 32, which as described in more detail below are for receiving radial adjustment devices. The disc scale member 104 comprises a body/substrate 105 (in this embodiment a planar annular disc-like body 5) on which a series of position features defining an optical, incremental scale 108 that extends around a scale axis B is provided on one of its planar faces. As per the previous embodiment, the body 105 on which the scale track 108 is provided, and the plurality of flexures 116 are formed from a single piece of material. The scale disc member 104 comprises a hole 114 through its middle and the four integral, radially-compliant flexures 116(a, b, c, d) which are provided in plane with the planar disc and are spaced equiangularly around the hole 114. The compliant flexures 116(a, b, c and d) are formed by providing an opening/void 122 in the body 105 closer its inner circumference than its outer circumference, so as to provide a radially weakened wall section.

The scale disc member 104 is initially located on the machine part 6/end-face 7 such that the scale axis (about which the scale extends around) and axis of rotation of the machine part are substantially parallel, and also the flexures 116 (a, b, c and d) are in a non-flexed state. As shown in FIGS. 8b and 9, radial adjustment devices, which in this embodiment are in the form of radial adjustment bolts 28 which are the same as those in the above-described embodiment, can then be arranged so as to be in contact with the machine part 7 and the scale disc member 104 and subsequently manipulated to adjust the radial position of the scale disc member 104 in a controlled and predictable manner. In particular, as depicted in FIG. 10a, the threaded anchor portion 29 of the radial adjustment bolt 28a is received within the threaded holes 32 and rotated (e.g. in the clockwise direction) about the axis C until its tapered head 31 just touches the flexure 116a. From then on, any further rotation of the radial adjustment bolt 28a (e.g. in the clockwise direction) about the axis C will cause it to penetrate further into the threaded hole 32 in the direction indicated by arrow P, and because the radial position of the radial adjustment bolt 28 is fixed, and in particular the axis C about which it is rotated is radially fixed, the tapered head 31 will radially outwardly displace the flexure 116a (in the direction indicated by arrow D) which in turn will cause the body/ substrate 105 of the scale disc member 4 to be displaced accordingly. Any reaction force against such a displacement (e.g. due to friction and/or due to a resistance/reaction force provided by another radial adjustment bolt/stop member), will in turn be direct into and reacted by the machine part via contact between the radial adjustment bolt's anchor portion 32 and the machine part's threaded hole 32, as schematically illustrated by arrow R in FIG. 10a. As with the above-described embodiment, an appropriately configured adjustment bolt 28c (or stop member) located against the opposing flexure will mean that a reaction/resistance force is created against such displacement, thereby facilitating easy and controllable undoing of any such displacement by simply rotating the radial adjustment bolt 28a in the opposite (e.g. anti-clockwise) direction. Accordingly, this embodiment is very similar to that described above, but in this embodiment the radial adjustment devices are not received within the flexure void 122, and also the flexures are not designed to provide any substantial tangential compliance. As per the above-described embodiment, one or more supplemental fastener hole(s) 109 could be provided through the body/ substrate 105 on which the scale is provided, through which a fastener such as a clamping bolt can be passed and secured to the shaft (e.g. via a hole in the end-face 7), so as to clamp the annular body 105 in place.

FIG. 10b illustrates an alternative embodiment which is substantially the same as that shown in FIG. 10a, except that the machine part 6 comprises a raised central hub 6a which the tapered head 31 engages. Furthermore, in the embodiment, the radial adjustment device 28 additionally comprises a sleeve 27 which sits around the tapered head 31 of the radial adjustment bolt 28*a*. The sleeve 27 could be configured to rotate with the radial adjustment bolt 28*a* or could be configured such that it does not rotate with rotation of the radial adjustment bolt 28 about the axis C. The sleeve 27 could be made from a different material from the tapered head 31, and therefore could be made from material, such as a plastics material, so as to reduce friction experienced when turning the bolt 28*a* about the axis C. As will be understood, the provision of such a sleeve or similar member is not limited to the embodiment of FIG. 10*b*, but is equally applicable in the other embodiments described above and below. Furthermore, as will also be understood, in other embodiments, a lubricant could be located at the point of contact between the radial adjustment device and machine part to reduce friction therebetween.

As the radial adjustment bolt 28*a* is rotated about the axis C to cause it to penetrate further (in the direction indicated by arrow P in FIG. 10*b*) into the threaded hole 32, the contact between the radial adjustment device 28 (in particular in this embodiment its tapered head 31/sleeve 27) and the central hub 6*a* will cause the tapered head 31/sleeve 27 to be pushed radially outward which in turn will radially outwardly displace the flexure 116*a* (in the direction indicated by arrow D) which in turn will cause the body/substrate 105 of the scale disc member 4 to be displaced accordingly. Any reaction force against such a displacement (e.g. due to friction and/or due to a resistance/reaction force provided by another radial adjustment bolt/stop member), will in turn be directed into and reacted by the machine part 6 via the contact between radial adjustment device 28 and the central hub 6*a* of the machine part, as schematically illustrated by arrow R in FIG. 10*b*. As will be understood, in contrast to the embodiment of FIG. 10*a* the radial adjustment device 28 needs to have sufficient play within the hole 32, or be sufficiently flexible/compliant, such that the radial adjustment bolt can be positioned at different axial depths within the hole 32 without locking up.

FIG. 10*c* illustrates an alternative embodiment which shares some similarities with the embodiments of FIGS. 10*a* and 10*b*, in particular in that the disc scale member 104 of FIG. 10*c* is identical to those of FIGS. 10*a* and 10*b*. Similar to the embodiment of FIG. 10*b*, the shaft 6 comprises a central hub 6*a* that extends through the hole 114 of the disc scale member 104. However in this embodiment, the radial adjustment member 328 merely comprises a wedge-shaped member 31' which can be press-fit between the central hub 7*a* and the flexure 116*a* so as to be in contact with them both. Due to the wedge-shape of the radial adjustment member 328, the further it is axially pressed downward (in the direction shown in FIG. 10*c*) the more it will radially outwardly displace the flexure 116*a* (in the direction indicated by arrow D) which in turn will cause the body/substrate 105 of the scale disc member 4 to be displaced accordingly. Any reaction force against such a displacement (e.g. due to friction and/or due to a resistance/reaction force provided by another radial adjustment bolt/stop member), will in turn be directed into and reacted by the machine part 6 via the contact between the radial adjustment member 328 and the central hub 6*a* of the machine part, as schematically illustrated by arrow R in FIG. 10*c*.

FIGS. 11 and 12 show another alternative embodiment of a disc scale member 204. Similar to the above-described embodiments, this embodiment comprises a disc scale member 204 which is to be mounted on a machine part 6 comprising an end-face 7 having a plurality of holes 232 for receiving radial adjustment devices. The disc scale member 204 comprises a body/substrate 205 (in this embodiment a planar annular disc-like body 205) on which a series of position features defining an optical, incremental scale 8 that extends around a scale axis B is provided on one of its planar faces. The scale disc member 204 comprises a hole 214 through its middle and four integral, radially-compliant flexures 216(*a, b, c, d*) which are provided in plane with the planar disc and are spaced equiangularly around the hole 214. As per the previous embodiments, the body 205 on which the scale track 8 is provided, and the plurality of flexures 216 are formed from a single piece of material. The flexures 216 of this embodiment are similar to that of the first embodiment (of FIGS. 1 to 6) except that they do not comprise the legs portions 20 and so offer little, or substantially no tangential compliance. As per the above-described embodiments, one or more supplemental fastener hole(s) 209 could be provided through the body/substrate 205 on which the scale is provided, through which a fastener such as a clamping bolt can be passed and secured to the shaft (e.g. via a hole in the end-face 7), so as to clamp the annular body 205 in place. As per the other above-described embodiments, the scale disc member 204 is initially located on the machine part 6/end-face 7 such that the scale's axis (i.e. the axis about which the scale features extend) and the axis of rotation of the machine part are substantially parallel, and also the flexures 216 (*a, b, c* and *d*) are in a non-flexed state. As shown in FIGS. 12*a* and 12*b*, radial adjustment devices 228, are then arranged so as to be in contact with the machine part 6 and the scale disc member 204 and subsequently used to adjust the radial position of the scale disc member 204 in a controlled and predictable manner.

The radial adjustment devices 228*a*, 228*b* provided with this embodiment are different to those of the above-described embodiments. As shown in FIGS. 11 and 12, a radial adjustment device 228 comprises a cam member 231 which is arranged to engage a contact face 24 of a flexure 216*a* and configured to rotate about a radially fixed axis C, such that the extent to which it cases the contact face 24 of the flexure 216*a* to be displaced can be controlled by the extent of rotation of the cam member 231. In this case, the cam member 231 is provided by an oval-shaped head portion 231 which is mounted to an anchor portion 229. The anchor portion comprises a peg which is received within a hole 232 of the machine part 6/end-face 7. The cam member/oval-shaped head portion 231 and anchor portion 229 could be formed from a single piece of material and configured to rotate together, in which case the anchor portion 229 and hole 232 will need to have circular cross-sectional shapes (e.g. they could both be cylindrical or conical in shape). Alternatively, the cam member/oval-shaped head portion 231 could be attached to the anchor portion 229 such that the cam member/oval-shaped head portion 231 can rotate relative to the anchor portion 229. In such a case, optionally the anchor portion 229 could be configured to not rotate within the hole 231, which could be achieved, for instance, by providing them with non-circular cross-sectional shapes. FIG. 12*a* illustrates the cam member/oval-shaped head portion 231 in two rotational positions—the solid line shows the cam member/oval-shaped head portion 231 in the position shown in FIG. 11 (i.e. with its shorter radius in contact with the contact face 24) and the phantom line shows the cam member/oval-shaped head portion 231 having been rotated by 90° (i.e. with its longer radius in contact with the contact face 24) such that it will cause the contact face 24 and hence the flexure 16 to be radially displaced inwardly in the direction shown by arrow D. As with the other embodiments, any radial reaction force (e.g. due to another radial adjustment devices 228*b* being mounted so as to engage the opposing flexure 216*c*) will be reacted by the machine part 6/end-face 7 via the anchor portion as schematically illustrated by arrow R in FIG. 12*a*.

In this embodiment, rather than another radial adjustment device being mounted to the machine part 6/end-face 7 so as to act against the opposing flexure 216*c*, a dedicated stop member 250 is instead mounted to the machine part 6/end-face 7 so as to act against the opposing flexure 216*c*. The dedicated stop member 250 comprises an anchor portion 252 which is received within a hole 232 of the machine part 6/end-face 7, and a cylindrical flexure stop portion 254 which is configured to fit snugly against the flexure 216*c*. Similar to the second radial adjustment bolt 28*c* described above in connection with FIGS. 7(C) and 7(D), the dedicated stop member 250 will provide a radial reaction force against the radial displacement caused by the radial adjustment device, and thereby facilitates easy and controllable undoing of the radial displacement caused by the radial adjustment device 228 (i.e. which can be achieved by simply rotating the radial adjustment device 228 in the opposite (e.g. anti-clockwise) direction). However, in contrast to the second radial adjustment bolt 28*c* described above in connection with FIGS. 7(C) and 7(D), the dedicated stop member 250 is not configured to effect any radial displacement of the disc scale member (e.g. any manipulation/rotation of it will not cause any radial displacement).

In the above-described embodiments, the flexures 16/116/216 are located radially inward of the scale 8. In particular, in the above-described embodiments, the body/substrate 5/105/205 comprises a hole 14/114/214 through its middle and the flexures 16/116/216 are arranged around the edge of the hole. However, this need not necessarily be the case. For instance, as shown in FIGS. 13 and 14, there is provided a scale disc member 304 positioned on an end-face 307 of a machine part/shaft 306. The machine part/shaft 306 is configured to rotate about an axis of rotation A. The scale disc member 305 comprises a body/substrate 305 on which a series of position features defining a scale 8 that extends around a scale axis B is provided on one of its planar faces, and a plurality of integral flexures 316*a*, 316*b*, 316*c*. In this embodiment, the body/substrate 305 does not comprise a hole extending through its middle around which the flexures are provided. Instead, the flexures 316*a*, 316*b*, 316*c* are provided radially outward of the scale 8. The flexures 316(*a*, *b* and *c*) are formed by providing an opening/void 322 in the body/substrate 305 proximal its outer circumference, so as to provide a radially weakened wall section.

Similar to the above-described embodiments, the scale disc member 304 is initially located on the machine part 306/end-face 307 such that the flexures 316 (a, b and c) are in a non-flexed state. Subsequently, radial adjustment devices, which in this embodiment are in the form of radial adjustment bolts 28 which are the same as those in the above-described embodiments according to FIGS. 1 to 10, can be then be arranged on the machine part 306 so as to be in contact therewith and the scale disc member 304 and subsequently manipulated to adjust the radial position of the scale disc member 304 in a controlled and predictable manner. In particular, as depicted in FIG. 14, the threaded anchor portion 29 of the radial adjustment bolt 28*a* is received within a threaded hole 332 of the machine part 306/end-face 307 and rotated (e.g. in the clockwise direction) about the axis C until its tapered head 31 just touches the flexure 316*a*. From then on, any further rotation of the radial adjustment bolt 28*a* (e.g. in the clockwise direction)

about the axis C will cause it to penetrate further into the threaded hole 332 in the direction indicated by arrow P, and because the radial position of the radial adjustment bolt 28 is fixed, and in particular the axis C about which it is rotated is radially fixed, the tapered head 31 will radially inwardly displace the flexure 316*a* (in the direction indicated by arrow D) which in turn will cause the body/substrate 305 of the scale disc member 304 to be displaced accordingly. Any reaction force against such a displacement (e.g. due to friction and/or due to a resistance/reaction force provided by another radial adjustment bolt/stop member), will in turn be reacted by the machine part via the radial adjustment bolt's anchor portion 32, as schematically illustrated by arrow R in FIG. 14. As with the above-described embodiment, an appropriately configured adjustment bolt 28*c* (or stop member) located against another opposing flexure will mean that a reaction/resistance force is created against such displacement, thereby facilitating easy and controllable undoing of any such displacement by simply rotating the radial adjustment bolt 28*a* in the opposite (e.g. anti-clockwise) direction.

FIG. 15 shows another alternative embodiment of a disc scale member 404. Similar to the above-described embodiments, this embodiment comprises a disc scale member 404 which is to be mounted on a machine part 6 comprising an end-face 7 having a plurality of holes 32 for receiving radial adjustment devices 28. The disc scale member 404 comprises a body/substrate 405 (in this embodiment a planar annular disc-like body 405) on which a series of position features defining an optical, incremental scale 8 that extends around a scale axis is provided on one of its planar faces. The scale disc member 404 comprises a hole 414 through its middle and three integral, radially-compliant flexure pairs 416(*a*, *b*, *c*) which are provided in plane with the planar disc and are spaced equiangularly around the hole 414. Accordingly, the scale disc member is similar to those described above, except that rather than each radially-compliant flexure comprises a single flexure, they are provided via a pair of cantilevered flexures. Such flexures pairs could also be used, for instance, in place of the single flexure constructs shown in other above-described embodiments. As per the above-described embodiments, the scale disc member 404 is initially located on the machine part 6/end-face 7 such that the flexures 416 (*a*, *b*, *c*) are in a non-flexed state. Subsequently, radial adjustment devices, which in this embodiment are in the form of radial adjustment bolts 28 which are the same as those in the above-described embodiments according to FIGS. 1 to 10, can be then be arranged so as to be in contact with the machine part 6 and the scale disc member 404 (in this embodiment, a flexure pair 416*a*, 416*c*) and subsequently manipulated to adjust the radial position of the scale disc member 404 in a controlled and predictable manner. As per the above-described embodiments, one or more supplemental fastener hole(s) 409 could be provided through the body/substrate 405 on which the scale is provided, through which a fastener such as a clamping bolt can be passed and secured to the shaft (e.g. via a hole in the end-face 7), so as to clamp the annular body 405 in place.

FIG. 16 shows an embodiment where the disc scale member 4 according to FIG. 1 is mounted on a machine part 6' which has a part 6" which extends through the central hole 14. However, the diameter of the part 6" which extends through the central hole is smaller than the smallest possible diameter which can be defined by the flexures 16. As with the above-described embodiments, the scale disc member 4 is initially located on the machine part 6/end-face 7 such that the flexures 16 (*a*, *b*, *c*, *d*) are in a non-flexed state. Subsequently, radial adjustment devices, which in this embodiment are in the form of radial adjustment bolts 28 which are the same as those in the above-described embodiments according to FIGS. 1 to 10, are then be arranged so as to be in contact with the machine part 6 and the scale disc member 4 (in this embodiment, the flexures 16) and subsequently manipulated to adjust the radial position of the scale disc member 4 in a controlled and predictable manner. Accordingly, as with all the above-described embodiments, the flexures are not directly radially compressed between the radial adjustment device and any part of the machine part, and therefore the rotary scale member is not directly radially clamped to the machine part by the flexures.

In the above-described embodiments, the radial adjustment members are in direct contact with the flexures, in particular with the foot of the flexure. However, this need not necessarily be the case. For instance, the radial adjustment member(s) could be in contact with the body of the rotary scale member (e.g. its outer circumferential surface/perimeter) and one or more stop members could be arranged so as to be in contact with one or more of the flexures.

FIGS. 17a and 17b illustrate an alternative embodiment. The scale disc member 1300 of this embodiment comprises a planar, annular body 1302 on which a scale track 1304 is provided on one of its planar faces, and a hole 1306 through its middle through which the central hub portion 6a of the shaft 6 can extend when the scale disc 1300 is mounted on the shaft 6. Similar to the embodiment of FIG. 15, the scale disc member 1300 comprises three pairs of radially compliant cantilevered spring members 1308a, 1308b, 1308c which are provided in plane with the planar scale disc 1300 and spaced equidistantly around the edge of the hole 1306. A flexure void 1310a, 1310b, 1310c is provided directly behind each pair of cantilevered spring members 1308a, 1308b, 1308c.

In contrast to the above-described embodiments, the flexure pairs 1308 are shaped and sized such that the effective diameter of the hole 1306 is slightly smaller than the diameter of the central hub portion 6a of the shaft 6 onto which it is to be mounted. Accordingly, the scale disc member 1300 has to be force-fitted onto the central hub 6a, thereby causing the flexures 1308 to radially deflect into their respective flexure voids 1310. Once the scale disc member 1300 has been force-fitted onto the central hub 6a, there is a natural/default/automatic tight fit between them.

In contrast to the embodiment of FIG. 15, the flexure voids 1310 are not configured to receive an adjustment bolt via which the radial position of the disc can be adjusted. In contrast, the embodiment shown in FIGS. 17a and 17b, the radial adjustment device comprises one or more nudge blocks 1320a, 1320b, 1320c and associated grub screws 1326. The nudge blocks comprise rigid blocks having a threaded hole 1322 extending therethrough and an abutment feature in the form of a lip 1324 having a thickness which is small enough to fit in the gap between the central hub 6a and the inner edge of the hole 1306 of the scale disc member 1300. In order to adjust the radial position of the scale disc member 1300, a nudge block 1320 is placed such that its lip 1324 is received in the gap between the shaft 6 and the inner edge of the hole 1306 of the scale disc member 1300, and then a grub screw 1326 is inserted in the threaded hole 1322 and tightened via a tool 1328 until it engages the central hub 6a. At that point, further tightening of the grub screw 1326 causes the nudge block to be pushed radially outward, resulting in the lip 1324 radially displacing the scale disc member 1300. Such radial displacement will cause a change in the state of flex of the flexures 1308 and hence a change in the extent to which the flexures 1308 are pressed against the central hub 6a; accordingly, the magnitude of the radial reaction force opposing the displacement generated by the flexures 1308 will vary depending on the extent of radial displacement of the scale disc member 1300 away from its initial radial position. As will be understood, in this embodiment, the stop against which the flexures 1308 are radially Pressed is provided by an integral part of the machine part, i.e. the central hub 6a. The radial reaction force against the displacement (e.g. due to friction and/or due to the resistance/reaction force provided by one or more of the flexures 1308 pressing against the central hub 6a), will in turn be directed into and reacted by the machine part 6 via the contact between the radial adjustment device's grub screw 1322 and the central hub 6a.

As will be understood, in the embodiment shown two nudge blocks 1320a, 1320b are shown in place/in engagement with the scale disc member 1320 and shaft 6. A third nudge block 1320c is shown out of engagement with the scale disc member 1320 and shaft 6 to illustrate the various parts thereof and the grub screw 1326 and tool 1328. It might be that only one nudge block is required to provide the desired radial adjustment. Optionally, three nudge blocks could be used if desired.

In the embodiments of FIGS. 11, 13 and 15, there are shown configurations in which at least one of the flexures does not have a radial adjustment member or stop member located against it. This is feasible, but also it is also feasible for those embodiments to have such a radial adjustment member or stop member located against the flexure, if desired.

The embodiments described above relate to rotary scale member of the disc scale type, wherein the scale features are provided on a planar surface of the rotary scale member, but this need not necessarily be the case. Instead, for instance, the rotary scale member could be of the ring scale type wherein the scale features are provided on an axially-extending surface, e.g. on the outer circumferential (e.g. cylindrical) edge of a rotary scale member.

In the embodiments described above, the radial adjustment device is manipulated by rotating it about an axis (axis C). However, this need not necessarily be the case. For instance, the radial adjustment device could comprise a press-fit device. For instance, the radial adjustment device could comprise a plunger member having a flexure manipulation portion in the form of a tapered head and an anchor portion in the form of an elongate stem (e.g. like a traditional golf-tee). The anchor portion could be configured to be a snug fit within the hole 32, 232, 332 of the machine part 6, 206, 306/end-face 7, 207, 307 so as to radially anchor the radial adjustment device with respect to the machine part 6, 206, 306/end-face 7, 207, 307, and the depth of the radial adjustment device can be controlled (e.g. via a pushing or pulling force) so as to control the extent to which the tapered head displaces the flexure.

The invention claimed is:

1. A method of mounting a rotary scale member on a machine part which is configured to rotate about an axis of rotation, the rotary scale member comprising a body on which a series of scale features defining a scale that extends around a scale axis is or can be provided, and at least three radially-compliant flexures spaced around the scale axis, the method comprising:

i) locating the rotary scale member on the machine part such that the scale axis and axis of rotation are substantially parallel, ii) subsequently arranging at least a first radial adjustment device so as to contact both the machine part and the rotary scale member, and manipulating the at least first radial adjustment device so as to radially displace the body of the rotary scale member;

wherein at least the majority of any radial reaction force, generated as a result of the interaction of at least one of the flexures with a radial stop member against which it is radially pressed, and which is imparted on the at least first radial adjustment device by the rotary scale member in opposition to the radial displacement of the rotary scale member, is directed into, and reacted by, the machine part via the contact between the at least first radial adjustment device and the machine part.

2. A method as claimed in claim 1, wherein at step i) the at least three flexures are in a non-flexed state.

3. A method as claimed in claim 1, wherein the method additionally comprises anchoring to the machine part, adjacent at least one of the flexures, the radial stop member.

4. A method as claimed in claim 1, wherein the radial stop member comprises a radial adjustment device.

5. A method as claimed in claim 1, wherein the at least first radial adjustment device is arranged so as to contact one of the flexures of the rotary scale member, such that manipulating the at least first radial adjustment device causes a radial displacement of the flexure, and thereby a radial displacement of the body of the rotary scale member, wherein the radial reaction force is generated by the interaction of at least one other of the flexures with a radial stop member against which it is radially pressed.

6. A method as claimed in claim 5, in which at least the flexure in contact with the radial adjustment device being manipulated is not radially compressed between the radial adjustment device and any part of the machine part.

7. A method as claimed in claim 1, wherein at least one of the flexures defines a flexure void between the body of the rotary scale member and the part of the flexure which is configured to contact a radial stop member/radial adjustment device.

8. A method as claimed in claim 7, wherein the part of the radial stop member/radial adjustment device in contact with the flexure resides within the flexure void.

9. A method as claimed in claim 1, wherein the radial adjustment device comprises a rotatable member, rotatable about a radial adjustment device axis, configured such that rotation of the rotatable member causes a change in the radial displacement of the body of the rotary scale member.

10. A method as claimed in claim 9, wherein the radial adjustment device comprises a tapered member, configured such that rotation of the rotatable member about the radial adjustment device axis changes the axial position of the tapered member along the radial adjustment device axis, which in turn controls the extent of radial displacement of the body of the rotary scale member.

11. A method as claimed in claim 10, wherein the rotatable member of the radial adjustment device comprises a threaded member which is received by a threaded hole in the machine part, wherein rotation of the threaded member changes the axial position of the tapered member along the radial adjustment device axis.

12. A method as claimed in claim 11, wherein the tapered member and the threaded member are a single piece.

13. A method as claimed in claim 9, in which the radial adjustment device is anchored to the machine part such that the radial adjustment device axis is radially fixed with respect to the machine part.

14. A method as claimed in claim 1, wherein the rotary scale member comprises a disc scale member comprising a planar surface on which the series of scale features defining a scale is or can be provided, the scale axis extending normal to the planar surface.

15. An apparatus comprising a rotary scale member and a machine part which is configured to rotate about an axis of rotation, the rotary scale member comprising a body on which a series of scale features defining a scale that extends around a scale axis is or can be provided, and at least three radially-compliant flexures spaced around the scale axis, wherein the rotary scale member is located on the machine part such that the scale axis and axis of rotation are substantially parallel, the apparatus further comprising at least a first radial adjustment device arranged so as to contact both the machine part and the rotary scale member and which is configured to be manipulated so as to cause the body of the rotary scale member to be radially displaced, wherein at least the majority of any radial reaction force, generated as a result of the interaction of at least one of the flexures with a radial stop member against which it is radially pressed, and which is imparted on the at least first radial adjustment device by the rotary scale member in opposition to the radial displacement of the rotary scale member, is directed into, and reacted by, the machine part via the contact between the at least first radial adjustment device and the machine part.

16. A method as claimed in claim 1, comprising providing adjacent at least one of said flexures a radial stop member that is a separate piece to the machine part.

17. An apparatus as claimed in claim 15, wherein the radial stop member is a separate piece to the machine part and is arranged adjacent at least one of said flexures.

* * * * *